(12) United States Patent
Shibayama et al.

(10) Patent No.: US 12,519,853 B2
(45) Date of Patent: Jan. 6, 2026

(54) COMPUTER SYSTEM AND MANAGEMENT METHOD FOR COMPUTER SYSTEM

(71) Applicant: Hitachi, Ltd., Tokyo (JP)

(72) Inventors: Tsukasa Shibayama, Tokyo (JP); Akira Deguchi, Tokyo (JP); Mitsuo Hayasaka, Tokyo (JP)

(73) Assignee: Hitachi Vantara, Ltd., Kanagawa-ken (JP)

( * ) Notice: Subject to any disclaimer, the term of this patent is extended or adjusted under 35 U.S.C. 154(b) by 0 days.

(21) Appl. No.: 18/442,270

(22) Filed: Feb. 15, 2024

(65) Prior Publication Data

US 2025/0175524 A1 May 29, 2025

(30) Foreign Application Priority Data

Nov. 28, 2023 (JP) ................................. 2023-201014

(51) Int. Cl.
 *H04L 67/1097* (2022.01)
 *H04L 41/042* (2022.01)

(52) U.S. Cl.
 CPC ........ *H04L 67/1097* (2013.01); *H04L 41/042* (2013.01)

(58) Field of Classification Search
 None
 See application file for complete search history.

(56) References Cited

U.S. PATENT DOCUMENTS

| | | | | |
|---|---|---|---|---|
| 5,592,618 | A | * 1/1997 | Micka | G06F 11/2074 714/E11.107 |
| 2004/0267829 | A1 | 12/2004 | Hirakawa et al. | |
| 2006/0259722 | A1 | * 11/2006 | Watanabe | G06F 11/1469 711/162 |
| 2018/0203607 | A1 | * 7/2018 | Chen | G06F 3/0619 |
| 2019/0310925 | A1 | 10/2019 | Yoshida et al. | |
| 2020/0311137 | A1 | * 10/2020 | Gupta | G06F 3/067 |
| 2024/0143554 | A1 | * 5/2024 | Kaushik | G06F 16/128 |

FOREIGN PATENT DOCUMENTS

| | | |
|---|---|---|
| JP | 2005-018506 A | 1/2005 |
| JP | 2019-185328 A | 10/2019 |

\* cited by examiner

*Primary Examiner* — Mohamed Ibrahim
(74) *Attorney, Agent, or Firm* — Volpe Koenig

(57) ABSTRACT

A computer system includes a storage system that constructs a primary site that provides one or a plurality of primary volumes to a host, a storage cluster that is connected to the storage system via a network, and has a plurality of nodes, and a management computer. When a secondary site having a secondary volume to which a remote copy of a primary volume at the primary site is set is constructed in the storage cluster, the management computer manages, as a group, a plurality of volumes including a secondary volume, and performs control such that a plurality of volumes including the secondary volume are placed in a plurality of nodes of the storage cluster based on the group.

10 Claims, 19 Drawing Sheets

FIG. 7

DEVICE-SIDE CONFIGURATION MANAGEMENT TABLE

204-1

| RESOURCE ID | CAPACITY | ATTRIBUTE | NODE |
|---|---|---|---|
| V1 | 100GB | Normal | N1 |
| V2 | 1TB | Journal | N1 |
| ... | ... | | |

204-2

| RESOURCE ID | JVOL ID | JVOL CAPACITY | Status | USAGE RATE | NODE |
|---|---|---|---|---|---|
| J1 | V2 | 1TB | Normal | 70% | N1 |
| J2 | V7 | 2TB | Normal | 20% | N1 |
| ... | ... | | | | |

204-3

| RESOURCE ID | PVOL ID | PJNL ID | SVOL ID | SJNL ID | Group ID | Status |
|---|---|---|---|---|---|---|
| Rep1 | V1 | J2 | V2 | J21 | G1 | pair |
| Rep2 | V5 | J6 | V6 | J61 | G1 | suspend |
| ... | | | | | | |

204-4

| RESOURCE ID | Initiator DEVICE ID | Initiator Port ID | Target DEVICE ID | Target Port ID | PATH GROUP ID |
|---|---|---|---|---|---|
| RP1 | A1 | P1 | A2 | P2 | PG1 |
| ... | | | | | |

204-5

| DEVICE ID | NODE ID | Port ID |
|---|---|---|
| A1 | N1 | P1 |
| | | P2 |
| | ... | |
| ... | | |

204-6

| ITEM | UPPER LIMIT |
|---|---|
| JOURNAL | FOUR FOR ONE NODE |
| ... | |

FIG. 8

DEVICE-SIDE OPERATION INFORMATION MANAGEMENT TABLE 205-1

| ID | METRIC | TIME | VALUE |
|---|---|---|---|
| CPU1 | CPU USAGE RATE | 10:00:00 | 20 |
| | | 10:01:00 | 25 |
| | | ... | |
| CPU2 | ... | | |
| Memory | MEMORY Write Pend Rate | 10:00:00 | 10 |
| | | 10:01:00 | 20 |
| | | ... | |

205-2

| VOL ID | METRIC | TIME | VALUE |
|---|---|---|---|
| V1 | IOPS | 10:00:00 | 500 |
| | | 10:01:00 | 600 |
| | | ... | |
| | DATA TRANSFER SPEED | 10:00:00 | 50 |
| | | 10:01:00 | 55 |
| | | ... | |
| ... | ... | | |

205-3

| Group ID | PJNL ID | SJNL ID | METRIC | TIME | VALUE |
|---|---|---|---|---|---|
| G1 | J2 | J21 | DATA TRANSFER SPEED | 10:00:00 | 500 |
| | | | | 10:01:00 | 550 |
| | | | | ... | |
| | ... | | ... | | |

| STORAGE CONTROLLER ID | STATE | SCG ID | NODE ID | MANAGEMENT CAPACITY | AVAILABLE CAPACITY |
|---|---|---|---|---|---|
| 1 | Active | 1 | 1 | 1TB | 500GB |
| 2 | Standby | 1 | 2 | | |
| 3 | Active | 2 | 2 | 2TB | 1TB |
| 4 | Standby | 2 | 3 | | |
| 5 | Active | 3 | 3 | 1TB | 100GB |
| 6 | Dead | 3 | 4 | | |
| 7 | Dead | 4 | 4 | 2TB | 500GB |
| 8 | Active | 4 | 1 | | |
| ... | ... | ... | ... | | |

FIG. 10

COST TABLE 407-1

| Type ID | NUMBER OF CPUS | CPU TYPE | MEMORY | STORAGE | NETWORK | COST |
|---|---|---|---|---|---|---|
| S1 | 1 | xx | 2GiB | 100GiB | Max5G | 0.01USD/MONTH |
| S2 | 2 | Xx | 4GiB | 200GiB | Max10G | 0.02USD/MONTH |
| S3 | 2 | yy | 8GiB | EXTERNAL CAPACITY | Max10G | 0.04USD/MONTH |
| ... | | | | | | |

407-2

| Type ID | TYPE | MAXIMUM IOPS | THROUGHPUT | COST |
|---|---|---|---|---|
| D1 | GENERAL-PURPOSE SSD | 16000 | 1000 | 0.1USD/G/MONTH |
| D2 | THROUGHPUT OPTIMAL HDD | 500 | 500 | 0.05USD/G/MONTH |
| D3 | Cold HDD | 250 | 250 | 0.01USD/G/MONTH |
| ... | | | | |

| Group ID | JNL ID | NODE TEMPORARY ID AFTER MIGRATION | REQUIRED MAXIMUM CAPACITY | VOLUME PERFORMANCE TOTAL MAXIMUM VALUE OF GROUP FOR EACH TIME | | |
|---|---|---|---|---|---|---|
| | | | | TIME | IOPS | THROUGHPUT |
| G1 | J11 | NN1 | 200 | 10:00:00 | 500 | 100 |
| | | | | 10:01:00 | 550 | 80 |
| | | | | ... | | |
| G2 | J21 | NN2 | 100 | 10:00:00 | 300 | 50 |
| | | | | 10:01:00 | 200 | 40 |
| | | | | ... | | |
| G3 | J21 | NN3 | 50 | 10:00:00 | 100 | 30 |
| | | | | 10:01:00 | 100 | 40 |
| | | | | ... | | |
| ... | | | | | | |

| NODE TEMPORARY ID AFTER MIGRATION | SERVER SPECIFICATION | DRIVE SPECIFICATION | DRIVE CAPACITY |
|---|---|---|---|
| NN1 | S1 | D1 | 200 |
| NN2 | S1 | D1 | 200 |
| NN3 | S1 | D1 | 200 |
| ... | | | |

| Group ID | GROUP CONFIGURATION ELEMENT | | GROUP-SPECIFIC REQUIREMENT | |
|---|---|---|---|---|
| | JNL | VOLUME | Affinity REQUIREMENT | SPECIFIC PERFORMANCE |
| GR1 | J1, J2 | Vol1, Vol2 | PROHIBITION AGAINST STAYING TOGETHER WITH GR2 | |
| GR2 | J21 | Vol3, Vol4 | PROHIBITION AGAINST STAYING TOGETHER WITH GR1 | |
| GR3 | J22 | Vol10, SS1 | | |
| ... | | | | |

COMPUTER SYSTEM AND MANAGEMENT METHOD FOR COMPUTER SYSTEM

BACKGROUND OF THE INVENTION

1. Field of the Invention

The present invention relates to a computer system and a control method for a computer system.

2. Description of the Related Art

Remote copy is used in a hybrid cloud operation mode in which on-premises data centers are combined or an on-premises data center and a cloud are combined. A storage system described in JP 2005-18506 A is known as the remote copy. JP 2005-18506 A describes that "A first storage system stores information regarding update of data stored in the first storage system as a journal. Specifically, the journal includes copy of data used for update and update information such as a write command at the time of update. Further, a second storage system acquires the journal via a communication line between the first storage system and the second storage system. The second storage system retains the copy of the data retained by the first storage system, and updates data corresponding to the data of the first storage system in order of data update in the first storage system by using the journal".

A computer system, for remote copy, copies and stores updated data written from a host server to a primary volume at a primary site (business site) to a journal volume (master journal volume). This data is copied to a journal volume (restore journal volume) of a secondary site (backup site) asynchronously with an I/O of the primary volume.

In this manner, data written from a host to the primary volume at the primary site is transferred to the secondary site asynchronously with a write request. The remote copy is completed by writing data from the restore journal volume to the secondary volume.

Further, in recent years, software defined storage (SDS) constructed by mounting storage control software on a general-purpose server device (hereinafter, storage node) has attracted attention. The demand for the SDS is increasing because the SDS does not require dedicated hardware and has high scalability. An information processing system in which a plurality of storage nodes on each of which one or a plurality of SDSs are mounted are combined to form one cluster and the cluster is provided to a higher device (hereinafter, host) as one storage device has been known as an information processing system using the SDS.

For example, JP 2019-185328 A discloses an information processing system that provides a virtual logical volume (virtual volume) from a plurality of storage nodes on which the SDS is mounted. JP 2019-185328 A describes that "A configuration of a redundancy group including a control unit placed in a storage node and set to an active mode for processing a request from a compute node and a control unit placed in another storage node and set to a passive mode for taking over processing when a failure occurs in the control unit or the like is inquired of the storage node, a plurality of paths from the compute node to a volume associated with the redundancy group are set based on an inquiry result, and at this time, a priority of a path connected to the storage node in which the control unit in an active mode is placed is set to be the highest, and a priority of a path connected to the storage node in which the control unit of the passive mode is placed is set to be the next highest.".

In the information processing system of JP 2019-185328 A, a storage controller (control software) is redundant by a combination of active and standby across a plurality of storage nodes, and the combination of the storage controllers is connected in a row among the storage nodes.

Further, in the information processing system of JP 2019-185328 A, a plurality of paths (multipaths) from a higher device to the storage node can be set, a first priority path is set for the storage node where active control software is present, and a second priority path is set for the storage node where standby control software is present. Since the execution of IO to the virtual volume is continued by switching the path to be used according to the priority when a failure occurs in the active control software and the standby control software is promoted to the active by a failover function due to the setting of the multipath, the information processing system of JP 2019-185328 A can implement a redundant configuration of the path.

SUMMARY OF THE INVENTION

In an environment in which a remote copy configuration is established between the storage devices of the on-premises data center, the volume at the secondary site may migrate to a storage device on the cloud for the purpose of reducing the cost of the secondary site.

In the on-premises, the storage device at the secondary site is one storage device. However, when the migration to the SDS described in, for example, JP 2019-185328 A on the cloud when the volume migrates to the cloud is considered, in a case where it is desired to continue an operation similar to the storage device before migration, it is difficult to determine how many storage nodes with how many specifications are to be prepared and which storage node the secondary volume and the journal volume (restore volume) at the secondary site are to be placed. In general, it is conceivable to place each volume such that an available capacity is averaged as much as possible in consideration of the available capacity of each storage node. Alternatively, it is conceivable to place each volume such that a performance load of each volume is balanced.

However, it is necessary to determine not only performance requirements and capacity use tendency between the on-premises data centers before migration, but also placement in which there is one storage before migration but there are a plurality of nodes after migration and which satisfies restrictions specific to failover of the active and standby control software and a remote copy function. In addition, since cost is regarded as important in the cloud, it is necessary to construct a configuration as inexpensive as possible.

Therefore, an object of the present invention is to propose a low-cost configuration while satisfying operational requirements before migration and satisfying restrictions specific to a remote copy function when a secondary site of remote copy is constructed on a cloud, and eliminate the need for a migration design.

Solution to Problem

In order object, one to achieve the above representative computer system of the present invention is a storage system that constructs a primary site that provides one or a plurality of primary volumes to a host, a storage cluster that is connected to the storage system via a network, and has a plurality of nodes, and a management computer. When a secondary site having a secondary volume to which a remote copy of a primary volume at the primary site is set is constructed in the storage cluster, the management computer manages, as a group, a plurality of volumes including a secondary volume, and performs control such that a plurality of volumes including the secondary volume are placed in a plurality of nodes of the storage cluster based on the group.

Further, a representative management method for a computer system of the present invention is a management method for a computer system that includes a storage system that constructs a primary site that provides one or a plurality of primary volumes to a host, a storage cluster connected to the storage system via a network and having a plurality of nodes, and a management computer. The method includes managing, as a group, a plurality of volumes including a secondary volume when the management computer constructs a secondary site having a secondary volume to which a primary volume at the primary site and a remote copy are set in the storage cluster, and performing control such that a plurality of volumes having the secondary volume are placed in a plurality of nodes of the storage cluster based on the group.

According to the present invention, it is possible to propose a configuration that achieves both performance and cost when a secondary site of remote copy is constructed on a cloud. Other objects, configurations, and effects will be made apparent in the descriptions of the following embodiments.

BRIEF DESCRIPTION OF THE DRAWINGS

FIG. 7 illustrates a configuration example of a device-side configuration management table 204.

FIG. 8 illustrates a configuration example of a device-side operation information management table 205.

FIG. 9 illustrates a configuration example of a control program management table 308.

FIG. 10 illustrates a configuration example of a cost table 407.

FIG. 11 illustrates a configuration example of a group performance, capacity, and node correspondence table 408.

FIG. 12 illustrates a configuration example of a required node specification table 409.

FIG. 18 illustrates a configuration example of a group management table 410 in the second embodiment.

DESCRIPTION OF THE PREFERRED EMBODIMENTS

Figure 1:
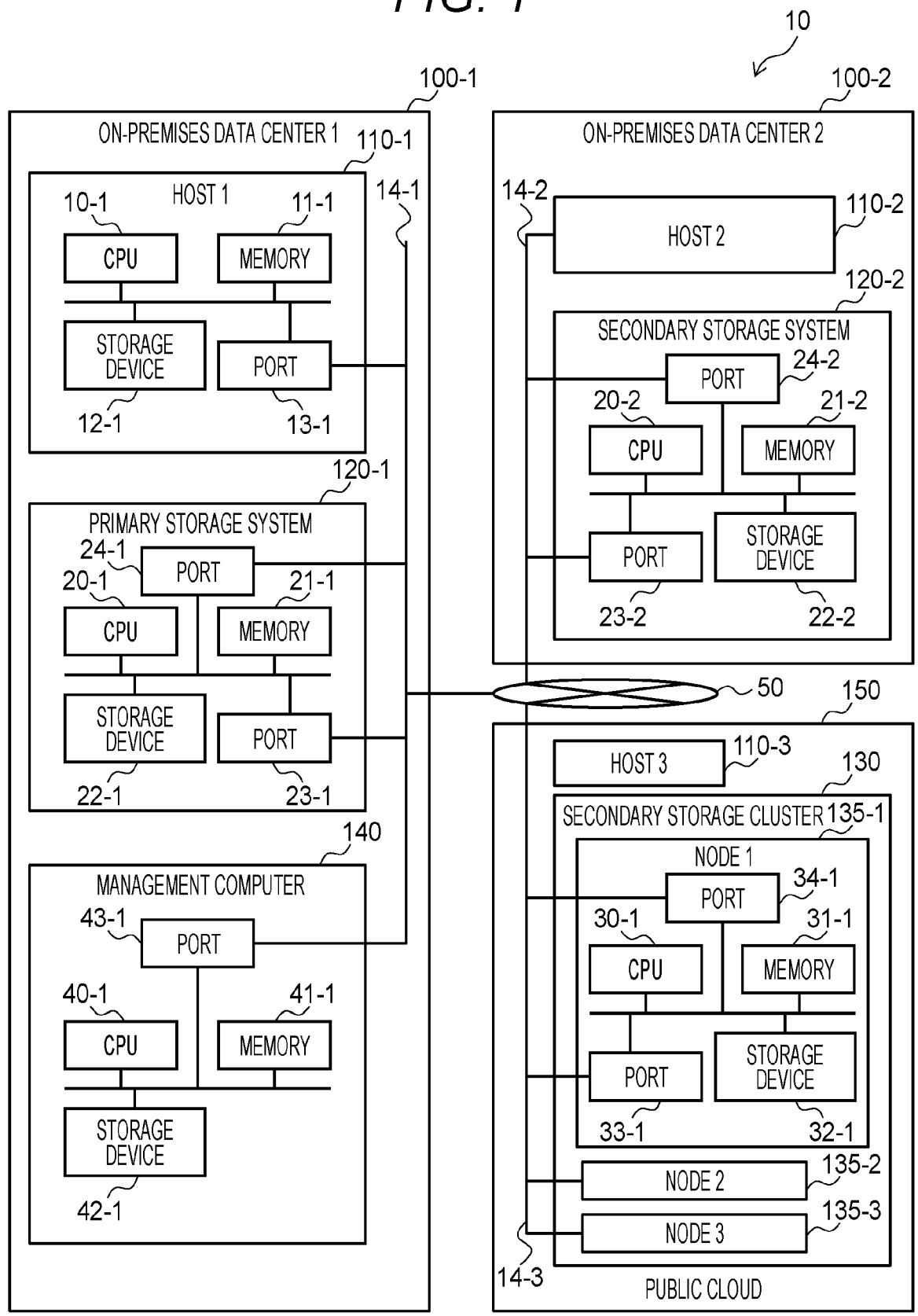
FIG. 1 illustrates a configuration of an overall system according to a first embodiment of the present invention.

In the following description, an "interface device" may be one or more interface devices. The one or more interface devices may be at least one of the following interface devices.

One or more input and output (I/O) interface devices. The input and output (I/O) interface device is an interface device for at least one of an I/O device and a remote computer for display. The I/O interface device for the computer for display may be a communication interface device. The at least one I/O device may be either a user interface device, for example, an input device such as a keyboard and a pointing device, or an output device such as a display device.

One or more communication interface devices. The one or more communication interface devices may be one or more communication interface devices of the same type (for example, one or more network interface cards (NIC)), or may be two or more communication interface devices of different types (for example, an NIC and a host bus adapter (HBA)).

Further, in the following description, a "memory" is one or more memory devices which are an example of one or more storage devices, and may be typically a main storage device. At least one memory device of the memory may be a volatile memory device, or may be a non-volatile memory device.

Further, in the following description, a "persistent storage device" may be one or more persistent storage devices, which are an example of one or more storage devices. The persistent storage device is typically a non-volatile storage device (for example, auxiliary storage device), specifically, for example, a hard disk drive (HDD), a solid state drive (SSD), a Non-Volatile Memory Express (NVME) drive, or a storage class memory (SCM).

Further, in the following description, the "storage device" may be at least the memory and the persistent storage device.

Further, in the following description, a "processor" may be one or more processor devices. At least one processor device is typically a microprocessor device, such as a central processing unit (CPU), but may be another type of processor device, such as a graphics processing unit (GPU). At least one processor device may be a single-core processor device, or may be a multi-core processor device. At least one processor device may be a processor core. At least one processor device may be a processor device in a broad sense such as a circuit (for example, a field-programmable gate array (FPGA), a complex programmable logic device (CPLD), or an application specific integrated circuit (ASIC)) that is an aggregate of gate arrays by a hardware description language that performs part or all of processing.

Further, in the following description, although information output for input may be described by an expression such as an "xxx table", the information may be data of any structure (for example, may be structured data or unstructured data), may be a neural network that generates an output for an input, or may be a learning model represented by a genetic algorithm or a random forest. Accordingly, the "xxx table" can be referred to as "xxx information". Further, in the following description, a configuration of each table is an example, and one table may be divided into two or more tables, or all or a part of two or more tables may be one table.

Further, although processing performed with "program" as a subject may be described, the program is executed by a processor, and thus, predetermined processing is appropriately performed by using the storage device and/or the interface device. Accordingly, the subject of the processing may be the processor (or a device or a system having the processor). The program may be installed on a device such as a computer from a program source. The program source may be, for example, a program distribution server or a computer-readable recording medium (for example, a non-transitory recording medium). Further, in the following description, two or more programs may be implemented as one program, or one program may be implemented as two or more programs.

Further, in the following description, an ID is adopted as an example of identification information of an element, but the identification information may be any information that can identify the element, such as a name.

Further, in the following description, a common reference sign of reference signs will be used when the same kind of elements are described without distinguishing these elements, and reference signs may be used when the same kind of elements are distinguished. For example, when a plurality of nodes are not distinguished, the nodes are described as "node 135", and when the nodes are distinguished, the nodes are described as "node 135-1", "node 135-2", and "node 135-3".

Hereinafter, several embodiments of the present invention will be described with reference to the drawings. Note that, in the following description, a logical volume is referred to as "Vol".

Example 1

FIG. 1 is a block diagram illustrating a configuration of a computer system 10 according to a first embodiment of the present invention.

The computer system 10 includes an on-premises data center 100-1 at a primary site, an on-premises data center 100-2 at a secondary site, and a public cloud 150 at the secondary site. These components are connected by a network 50. Further, the computer system 10 includes a storage system 120-1 and a storage system 120-2. Since asynchronous remote copy is operated between these storage systems, the storage system 120-1 is referred to as a primary storage system, and the storage system 120-2 is referred to as a secondary storage system. Further, the computer system 10 includes a storage cluster 130 as a secondary storage cluster. The computer system 10 further includes a management computer 140, a host 110-1 (host 1), a host 110-2 (host 2), and a host 110-3 (host 3). The host 110-1, the primary storage system 120-1, and the management computer 140 are positioned in the on-premises data center 100-1 at the primary site. The host 110-2 and the secondary storage system 120-2 are positioned in the on-premises data center 100-2 of the secondary site. The host 110-3 and the secondary storage cluster 130 are positioned in the public cloud 150 of the secondary site. Note that the management computer 140 is not limited to the on-premises data center 1, and may be positioned in either the on-premises data center 2 or the public cloud 150.

The network 50 may be redundant. The network may be any of Ethernet, FibreChannel, and/or Wireless network. A configuration and a connection relationship in which switches are also illustrated is merely an example, and there may be an increase or decrease from the number of notations. The network may be divided according to a protocol.

There are internal networks 14-1 (14-2 and 14-3) within the on-premises data centers 100-1 and 100-2 and the public cloud 150. These networks are described as one for the sake of convenience, but may be divided into a data input and output network and a network for management computer data. The protocol of the network may be TCP/IP, FC, or another protocol.

The storage system 120-1 (120-2) includes a storage device 22-1 (22-2) which is a data storage device, a data input and output port 23-1 (23-2), a management port 24-1 (24-2), a memory 21-1 (21-2), and a processor 20-1 (20-2) connected to these elements. The storage device may be a physical HDD, SSD, or the like.

The port 23-1 (23-2) performs interface processing of data input and output between the storage system 120-1 (120-2) and the host 110-1 (110-2), and may be, for example, an HBA. In the drawing, the data input and output port between the host and the storage system and the data input and output port between the primary and secondary storage systems are the same port, but may be different ports.

The port 24-1 (24-2) performs interface processing of management data input and output to and from the management computers 140, and may be, for example, an NIC.

The storage cluster 130 includes the node 135-1 (node 1), the node 135-2 (node 2), and the node 135-3 (node 3) which are the plurality of nodes, and each node includes a storage device 32-1 which is a data storage device, a data input and output port 33-1, a management port 34-1, a memory 31-1, and a processor 30-1 connected to these elements. Although details are omitted, the node 135-2 and 135-3 has the same configuration as the node 135-1. The storage device may be a physical HDD, SSD, or the like, or may be a virtual device.

The port 33-1 performs interface processing of data input and output between the storage system 120-1 and the host 110-3, and may be, for example, an HBA. In the drawing, the data input and output port between the host and the storage system and the data input and output port between the primary and secondary storage systems are the same port, but may be different ports.

The port 34-1 performs interface processing of management data input and output to and from the management computer 140, and may be, for example, an NIC. Although it has been described that the number of nodes is three in the drawing, any number of nodes may be used as long as the number of nodes is one or more.

The storage system 120-1 (120-2) and the storage cluster 130 provide one or a plurality of logical volumes from which data can be read and written to the host 110-1 (110-2 or 110-3). The storage system 120-1 (120-2) and the storage cluster 130 receive an I/O command (for example, a write command or a read command) designating a logical volume from the host 110-1 (110-2 or 110-3) and process the I/O command.

In response to the write command or the read command input from the host 110-1 (110-2 or 110-3), the storage system 120-1 (120-2) and the storage cluster 130 read and write data to and from an address position designated in the write command or the read command in the designated logical volume.

The management computer 140 includes a port 43-1 connected to a network 14-1, a storage device 42-1, a memory 41-1, and a processor 40-1 connected to these elements.

The processor 40-1 executes predetermined processing by using various programs and data stored in the memory 41-1 and the storage device 42-1 to control an operation of the port 43-1 and perform overall control of the management computer 140. The management computer 140 manages configuration information and operation information of the overall storage system 120-1 (120-2) and storage cluster 130.

The host 110-1 (110-2 or 110-3) includes a port 13-1 (13-2 or 13-3, not illustrated) connected to the internal network 14-1 (14-2 or 14-3, not illustrated), a storage device 12-1 (12-2 or 12-3, not illustrated), a memory 11-1 (11-2 or 11-3, not illustrated), and a processor 10-1 (10-2 or 10-3) connected to these elements. The port 13-1 (13-2 or 13-3) perform interface processing of data input and output between the storage system 120-1 (120-2) and the storage cluster 130. The processor 10-1 (10-2 or 10-3) executes predetermined processing by using various programs and data stored in the memory 11-1 (11-2 or 11-3) and the storage device 12-1 (12-2 or 12-3) to control an operation of the port 13-1 (13-2 or 13-3) and perform overall control.

Although it has been described that the numbers of storage systems, storage clusters, and hosts are one for the sake of convenience, there may be a plurality of storage systems, storage clusters, and hosts. Although it has been described that one processor, memory, storage device, and port included in each storage system, storage cluster, and management computer are one for the sake of convenience, there may be a plurality of processors, memories, storage devices, and ports.

The management computer may be included in the storage system, the host, or the storage system.

Figure 2:
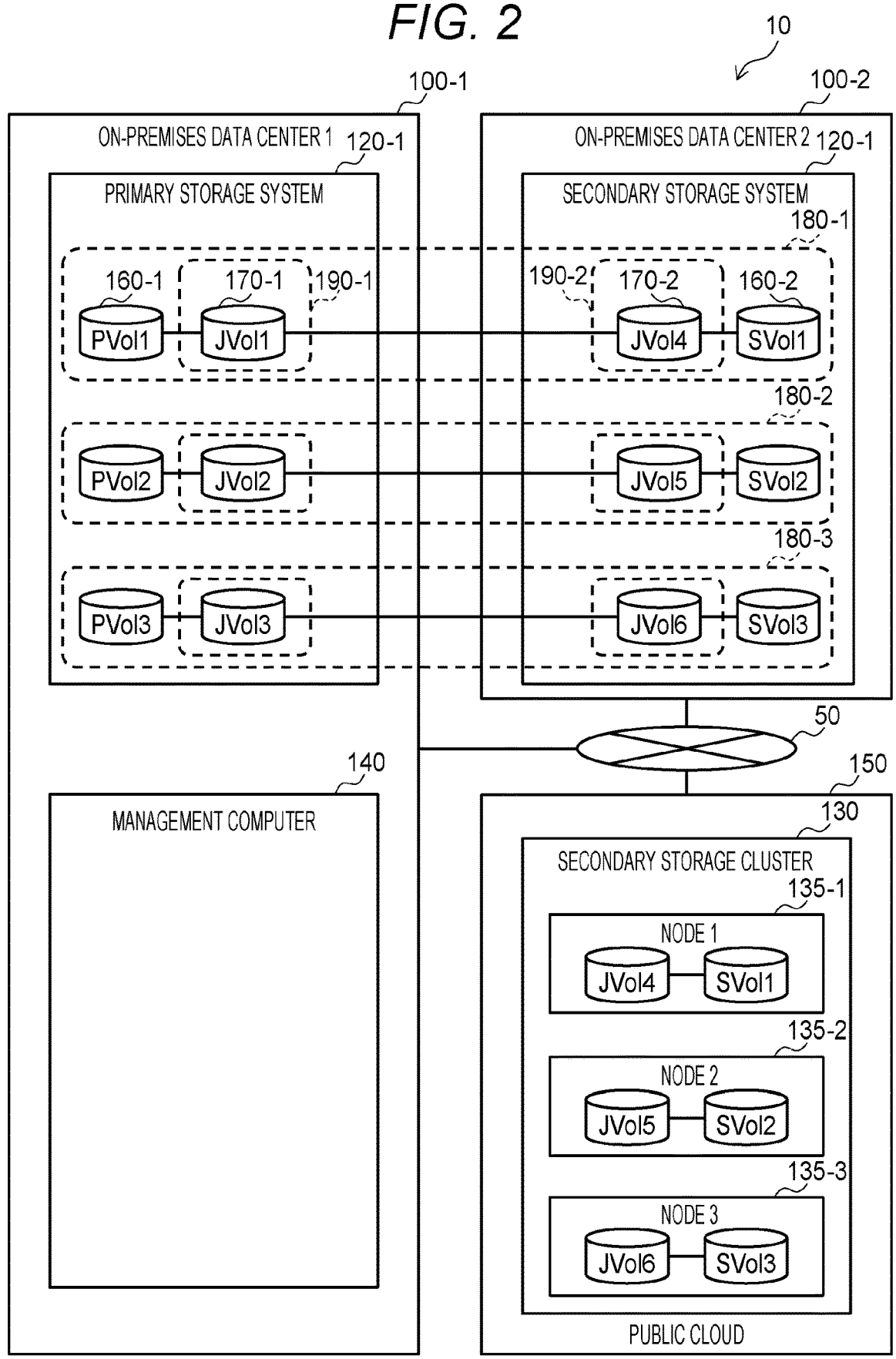
FIG. 2 illustrates a logical configuration of a volume and a journal of remote copy in the first embodiment.

FIG. 2 illustrates a functional block diagram of asynchronous remote copy performed between the primary storage system 120-1 at the primary site and the secondary storage system 120-2 at the secondary site. The asynchronous remote copy is a function of transferring data written from the host to the storage system at a business site (primary site) to the storage system at a backup site (secondary site) asynchronously with a write request.

A remote copy pair including groups (consistency group, also referred to as CTG) 180-1, 180-2, and 180-3 is set in a remote copy system including the on-premises data center 100-1 at the primary site and the on-premises data center 100-2 at the secondary site.

In the group 180-1, a primary volume PVOL1 (160-1) and a (master) journal PJNL1 (190-1) are set. A journal is also referred to as a journal group. The journal PJNL1 (190-1) includes a (master) journal volume (JVOL1) (170-1).

Then, a secondary volume SVOL1 (160-2) and a (restore) journal SJNL1 (190-2) are set in the on-premises data center 100-2 at the secondary site of the group 180-1. The journal SJNL1 (190-2) includes a (restore) journal volume (JVOL4) (170-2).

Update data written from the host 110-1 to the primary volume (PVOL1) is copied and stored in the primary journal volume (JVOL1). Update data (journal data) of the journal volume (JVOL1) is copied to the secondary journal volume (JVOL4) of the on-premises data center 100-2 at the secondary site asynchronously with the I/O to the primary volume (PVOL1).

Update data of the secondary journal volume (JVOL4) is written to the secondary volume (SVOL1) of the on-premises data center 100-2 at the secondary site. In the group 180-1, a remote copy pair of PVOL1-JVOL1-JVOL4-SVOL1 is set.

Although it has been described that the number of journal volumes included in one journal (journal group) 190-1 (190-2) is once for the sake of convenience, a plurality of journal volumes may be included.

Although it has been described that the number of PVOLS and SVOLs included in one group 180-1 is one for the sake of convenience, a plurality of PVOLs and SVOLs may be included.

Although it has been described that the number of groups 180 between the primary storage system and the secondary storage system or between the primary storage system and the secondary storage cluster is three for the sake of convenience, any number of groups may be used as long as the number of groups is one or more.

Although it has been described that the group 180-X and the journal (journal group) (190-X) are not illustrated in the storage cluster, the number of groups is similarly defined in the storage cluster.

Figure 3:
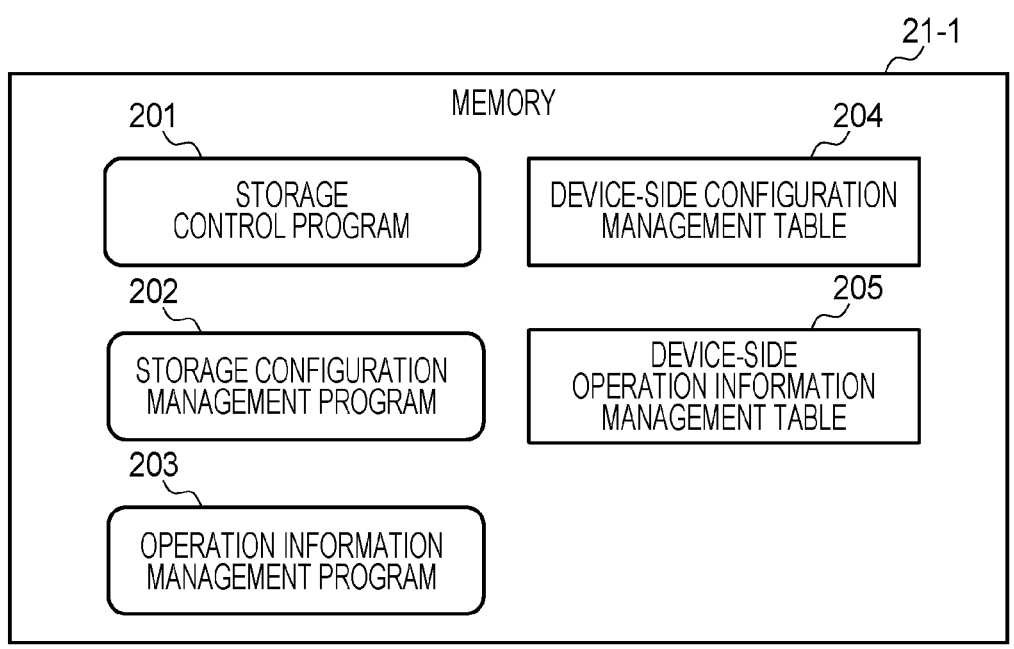
FIG. 3 illustrates an example of a program and data stored in a memory 21-x in a storage system 120-x.

FIG. 3 is a functional block diagram of a storage structure of the memory 21-1 (21-2) of the storage system 120-1 (120-2).

A storage control program 201 is software that receives a request from the host, performs I/O processing, and stores data in a drive. Further, the program is a program that performs overall storage control such as snapshot, compression, deduplication, and remote copy. In the present patent, detailed description is omitted.

A storage configuration management program 202 is a program for managing a configuration such as creation and deletion of volumes and journals.

An operation information management program 203 is a program for measuring, storing, and managing operation information of the CPU, the volume, or the like.

A device-side configuration management table 204 is a table for managing configuration information such as a volume and a journal of the storage system. This device-side configuration management table is updated by the storage configuration management program 202.

A device-side operation information management table 205 is a table of operation information of the CPU and the memory of the storage system, and is updated by the operation information management program 203.

Figure 4:
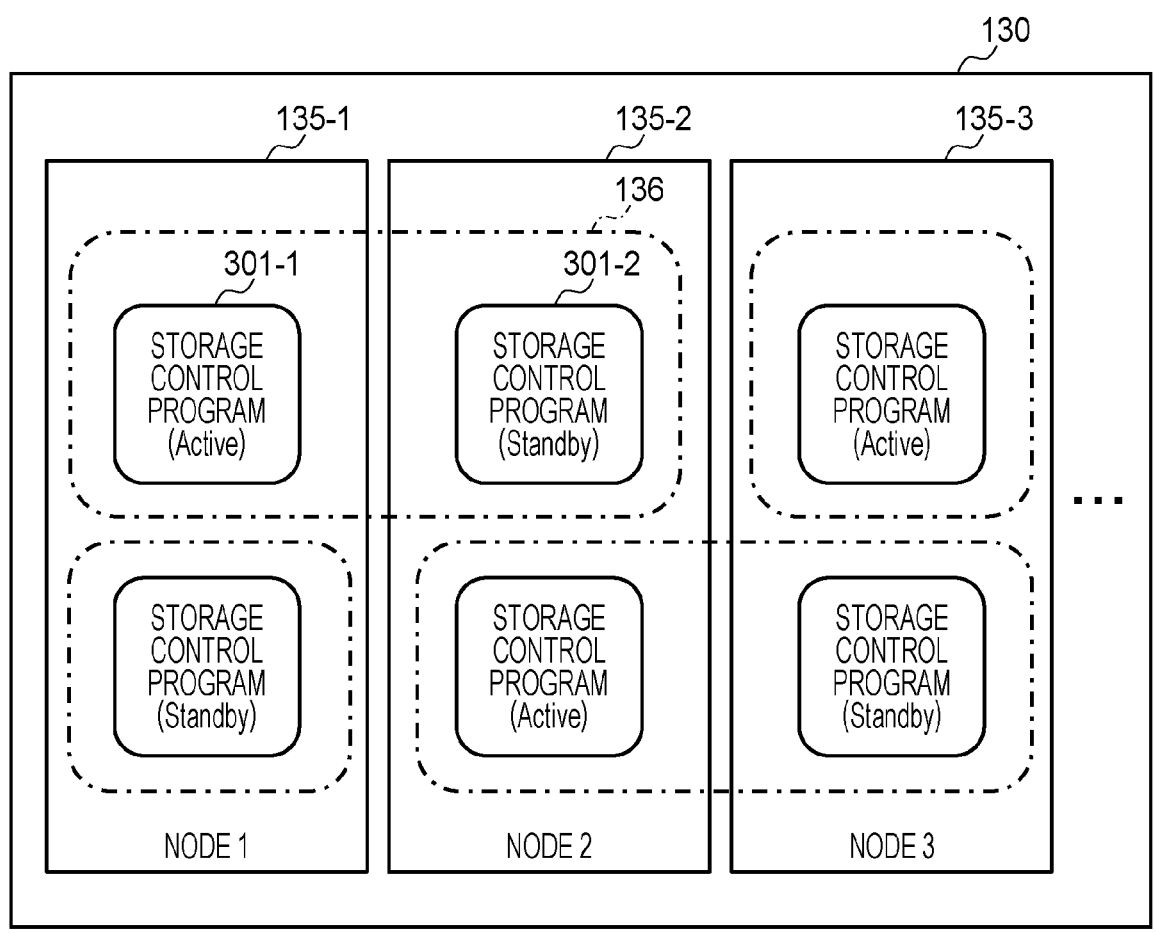
FIG. 4 illustrates an example of a layout of a storage control program of a storage cluster 130.

FIG. 4 is a diagram illustrating an example of a layout configuration of storage control software in the storage cluster 130.

A storage control program 301-1 is configured to be redundant by a combination of active (Active) and standby across a plurality of storage nodes 135-X. An active storage control program means that the storage control program is set to a state (active mode) of a currently used system capable of receiving an IO request from the host, and a standby storage control program means that the storage control program is set to a state (standby mode) of a standby system that does not receive an IO request from the host.

Further, in the storage cluster 130 in the computer system 10 according to the present embodiment, a redundancy group (storage controller group) 136 obtained by combining the active and standby storage control programs 301-1 and 301-2 is configured to be connected in a row in each node.

Note that, in FIG. 4, although one active storage control program 301-1 and one standby storage control program 301-2 are included in one redundancy group 136, in the present embodiment, one redundancy group 136 may include three or more storage control programs 301-1 and 301-2 (more specifically, one active storage control program 301-1 and two or more standby storage control programs 301-2).

Then, although detailed description is omitted, when a failure occurs in the active storage control program 301-1 and the standby storage control program 301-2 is promoted to active by failover control, the volume operating in the storage control program 301-1 of the node 1 appears to operate in the promoted storage control program 301-2.

Accordingly, each storage system normally operates in each node, and when a failure occurs in the node, a plurality of storage systems operate in a specific node.

Figure 5:
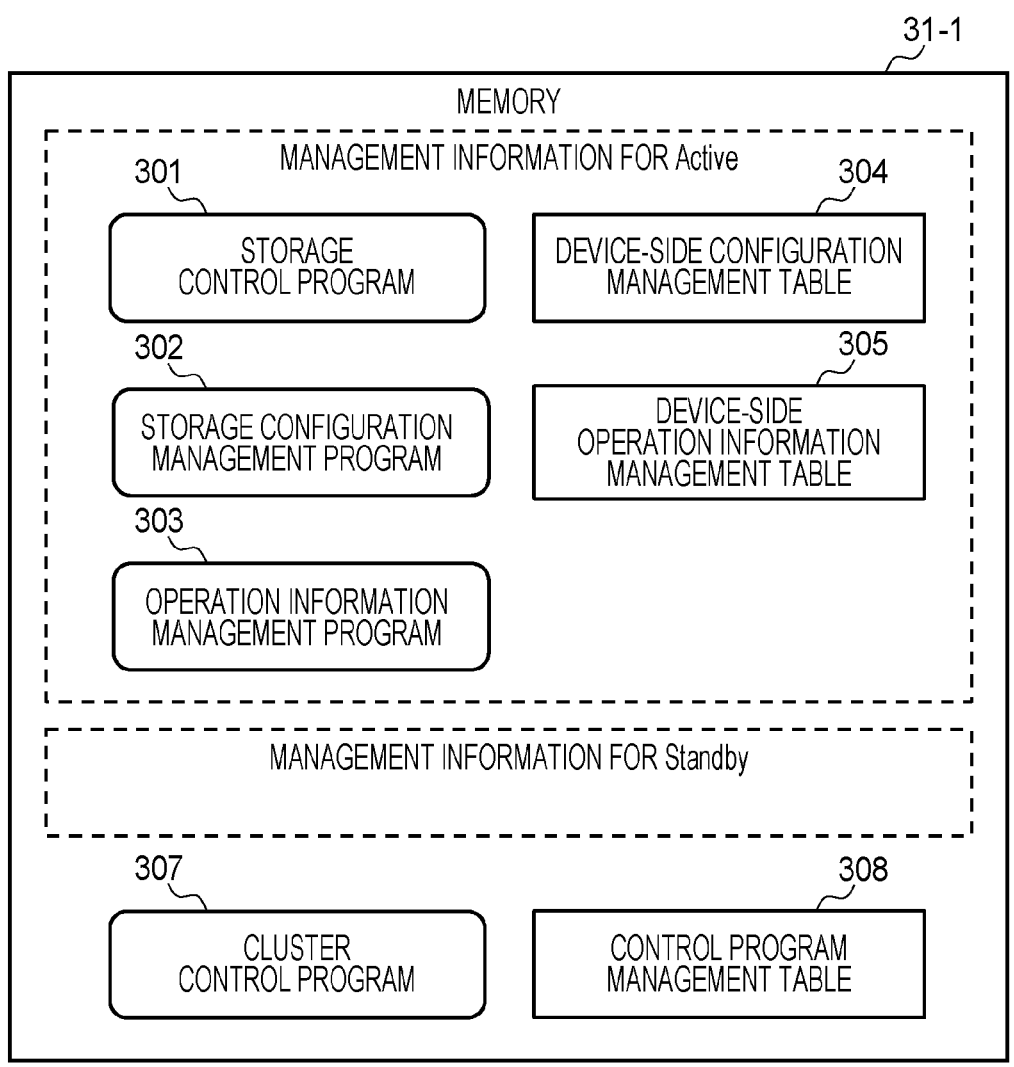
FIG. 5 illustrates an example of a program and data stored in a memory 31-x in the storage cluster 130.

FIG. 5 illustrates an example of programs and data stored in the memory 31-1 of the storage cluster 130.

As described with reference to FIG. 4, each storage system operates in each node, and on the other hand, since the storage systems are connected in a row, the active and standby storage control programs of different redundancy groups (storage controller groups) operate in each node. Accordingly, the memory has active management information and standby management information for the storage control program mainly operating in each node. A content of each piece of management information is the same as each program and management table included in the memory 11-1 of the storage system 120-1 described in FIG. 3.

In addition, the memory has a cluster control program 307 for controlling each storage system to operate in cooperation and a control program management table 308 indicating a relationship between a storage controller (storage control program) and each node in each storage system.

The cluster control program 307 and the control program management table 308 are information commonly retained in all the nodes, and may be retained in a representative one node or may be retained in a redundant manner in synchronization in a plurality of nodes. This drawing illustrates a configuration example in which the nodes are synchronously stored.

Figure 6:
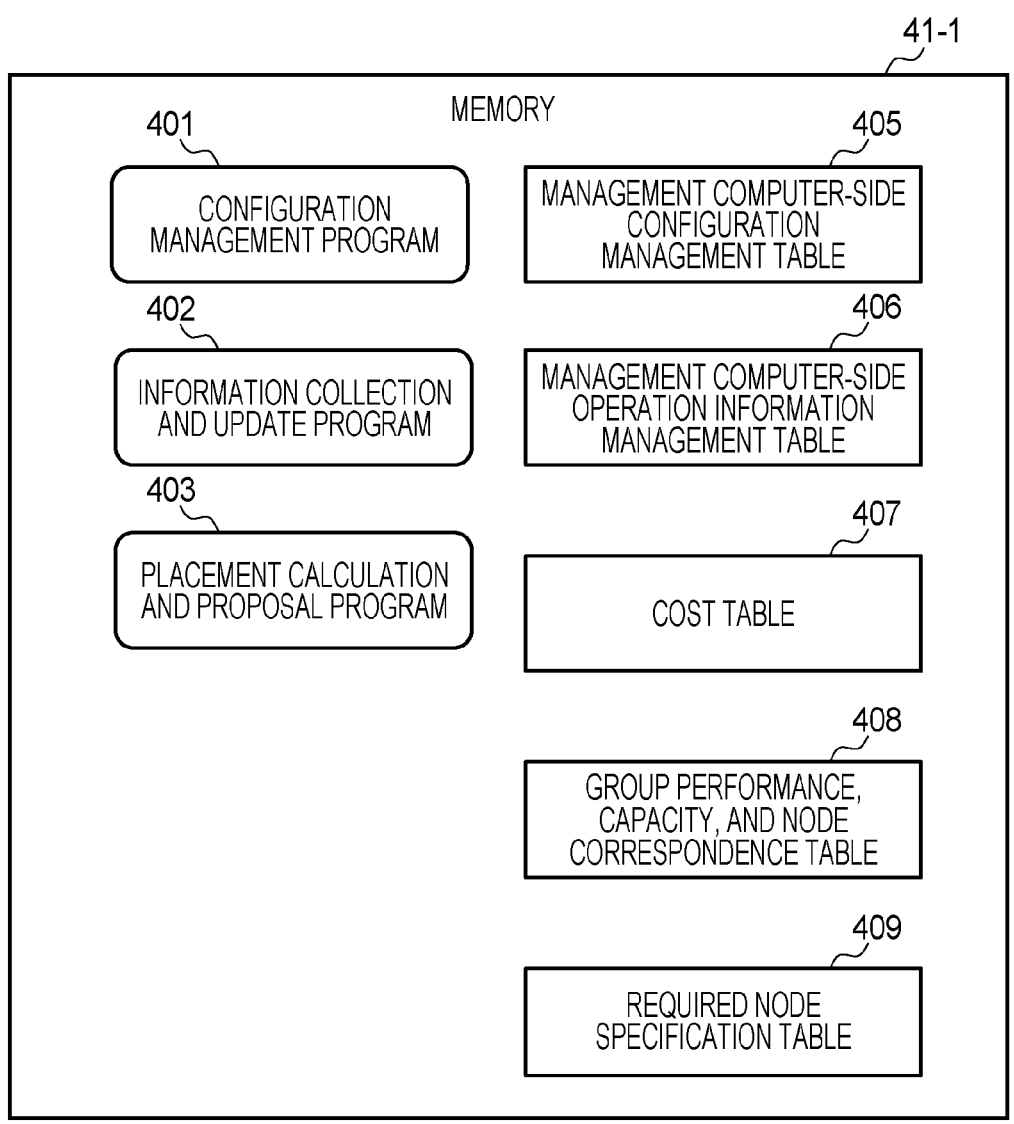
FIG. 6 illustrates an example of a program and data stored in a memory 41-1 in a management computer 140.

FIG. 6 illustrates an example of the program and data stored in the memory 41-1 in the management computer 140.

A configuration management program 401 is a program that manages a configuration of the storage to be managed.

An information collection and update program 402 is a program that collects and updates configuration information and operation information from the storage to be managed.

A placement calculation and proposal program 403 is a program that searches for and proposes the number of nodes, a node specification, and a resource placement configuration in which cost becomes low so as to satisfy restrictions on UR-specific information.

A management computer-side configuration management table 405 is a table indicating the configuration of the storage to be managed and is updated by the configuration management program 401. Contents retain the same information as the device-side configuration management table 204 stored in the memory of each storage system and the device-side configuration management table 304 stored in the memory of the storage cluster by the numbers of storage systems and storage clusters.

A management computer-side operation information management table 406 is a table of operation information of the CPU and the memory of the storage system to be managed, and is updated by the information collection and update program 402. Contents retain the same information as the device-side operation information management table 205 stored in the memory of each storage system and the device-side operation information management table 305 stored in the memory of the storage cluster by the numbers of storage systems and storage clusters.

A cost table 407 shows server and drive specifications and costs thereof. Input by a user or information provided by a cloud provider is collected and retained.

A group performance, capacity, and node correspondence table 408 is information indicating how much performance and capacity are required for each group of storage resources such as consistency groups and at which node is to be placed.

A required node specification table 409 is information indicating specifications of nodes required for placing resources of the group described in the group performance, capacity, and node correspondence table 408.

FIG. 7 illustrates a configuration example of the device-side configuration management table 204.

The device-side configuration management table 204 includes a volume management table 204-1, a journal management table 204-2, a pair management table 204-3, a remote path management table 204-4, a device physical configuration management table 204-5, and device upper limit specification information 204-6.

The volume management table 204-1 has a volume resource ID, a capacity, an attribute thereof, and a node. The attribute includes an attribute of a normal volume accessed by the host and an attribute used as a journal volume. The node indicates information on which node there is the volume (in the case of the storage cluster, a node in which there is the active storage controller).

The journal management table 204-2 has an ID of a journal resource, an ID (VOLID) of a journal volume included in a journal, a capacity of a journal volume (JVOL capacity), a status thereof (normal or error), a usage rate of a journal volume, and information of a node. The node indicates information on which node there is the journal (in the case of the storage cluster, a node in which there is the active storage controller).

The pair management table 204-3 has an ID (resource ID) of a remote copy pair, an ID (PVOL ID) of a primary volume included in the pair, an ID (PJNL ID) of a primary journal, an ID (SVOL ID) of a secondary volume, an ID (SJNL ID) of a secondary journal, a group ID when a plurality of pairs are managed as a group, and a status indicating a state of the pair.

The remote path management table 204-4 includes information of an ID (resource ID) of a remote path, an ID (initiator device ID) of a storage device at the primary site for which the remote path is set, a port ID (initiator port ID) of a storage device at the primary site, an ID (target device ID) of a storage device at the secondary site, a port ID (target port ID) of a storage device at the primary site, and a path group ID for grouping a plurality of remote paths.

The device physical configuration management table 204-5 has information of a device ID, a node ID, and a port ID. The node ID has information of one node in the case of the storage system and information of one or more nodes in the case of the storage cluster. The port ID has one or more port IDs connected to each node.

The device upper limit specification information 204-6 has items and upper limit information. The items describe types of resources (example: journal, volume, remote path, pair) for providing a function of the storage device. The upper limit is upper limit information on the specification of the resource. The example of FIG. 7 illustrates that a maximum of four journals can be placed for one node.

FIG. 8 illustrates a configuration example of the device-side operation information management table 205.

The device-side operation information management table 205 includes device operation information 205-1, volume operation information 205-2, and inter-journal operation information 205-3.

The device operation information 205-1 indicates IDs of the CPU and the memory as one of the resources of the storage system, a type of metric, a time, and a value of the metric at the time. A write pending rate of the memory indicates a ratio of data unwritten and accumulated in the memory due to an increase in write data. This write pending rate is one index indicating that a load of the storage system becomes high. The metric is not limited to a value described herein. For example, a response time of the volume, a drive operation rate for each drive, a cache hit rate of the memory, operation rates of the CPU, the memory, and the drive for each node in the storage cluster, and the like may be used. The device operation information 205-1 records a value for each minute, but a time interval is not limited thereto.

The volume operation information 205-2 includes an ID of a volume, information indicating a type of metric (operation information), a time, and a value of the operation information at each time. The volume operation information 205-2 records a value for each minute, but a time interval is not limited thereto.

The inter-journal operation information 205-3 records an ID of a group (consistency group) retaining the primary and secondary journals, an ID (PUNLID) of the journal at the primary site (the primary storage system 120-1), an ID (SJNLLID) of the journal at the secondary site (the secondary storage system 120-2), information indicating a type of metric, and a value at each time. The inter-journal operation information 205-3 records a value for each minute, but a time interval is not limited thereto.

FIG. 9 illustrates a configuration example of the control program management table 308.

The control program management table 308 has information of a storage controller ID, a state, an SCG ID, a node ID, a management capacity, and an available capacity. The storage controller ID indicates an identifier assigned to each storage control program 301 (in other words, storage controller). The state indicates a state of the storage control program 301 to be managed, and for example, not only active and standby states but also dead indicating a state of failure occurrence may be prepared. Further, not only standby indicating a standby state but also passive indicating a waiting state or the like may be prepared, or another value may be provided.

The SCG ID indicates a storage controller group ID to which the storage control program 301 to be managed belongs. The storage controller group ID is an identifier assigned to each redundancy group (storage controller group) 136 including a combination of the active and standby storage control programs 301. The node ID indicates an identifier of the storage node 135-X in which the storage control program 301 to be managed is placed. The management capacity indicates a total value of capacities (pools) managed in units of the redundancy group (storage controller group) 136 to which the storage control program 301 to be managed belongs. The pool is used by assigning a storage area from the drive. The available capacity indicates a capacity that can be created by the storage controller group to which the storage control program 301 to be managed belongs.

FIG. 10 illustrates a configuration example of the cost table 407.

The cost table includes server cost information 407-1 and drive cost information 407-2. The server cost information 407-1 includes a type ID, the number of CPUs, a CPU type, a memory, a storage, a network, and information of cost. The type ID indicates a type ID of the server. The number of CPUs indicates the number of CPUs of one server. The CPU type is information indicating the number of clocks and specifications of the CPU. The memory indicates a memory capacity. The storage has information indicating a capacity when the storage is included in the server, and information indicating an external capacity when the storage is not included. Other information may be described. The network describes a maximum available network bandwidth. The cost indicates a fee for using the server. Although a fee per month is described in the drawing, the present invention is not limited thereto, and a fixed fee may be described instead of cost per another period or a measured rate system. The information included in the server cost information 407-1 is not limited thereto, and another information indicating the cost of the server may be included.

The drive cost information 407-2 includes a type ID, a type, maximum IOPS, throughput, and information of cost. The type ID indicates a type ID of the drive. The type indicates a drive type. The maximum IOPS indicates maximum IOPS per drive. The throughput indicates maximum throughput per drive. The cost indicates a fee for using this drive. A fee per GiB per month is described in the drawing, but the present invention is not limited thereto, and a fixed fee may be described instead of cost per another period or a measured rate system. The information included in the drive cost information 407-2 is not limited thereto, and another information indicating the cost of the drive may be included.

The information in the cost table 407 may be previously set by the user or may be set by acquiring information provided by a public cloud vendor.

FIG. 11 illustrates a configuration example of the group performance, capacity, and node correspondence table 408.

The group capacity, performance, and node correspondence table 408 has information of a Group ID, JNL ID, a node temporary ID after migration, a required maximum capacity, and a volume performance maximum total value of the group for each time. The Group ID is an identifier of a set requiring to be collectively placed when the storage cluster migrates to the storage cluster at the secondary site. In the first embodiment, the journal group corresponds to the same consistency group (CTG) itself. A resource on the secondary site side within the CTG actually migrates to the storage cluster at the secondary site. The JNL ID is a journal ID on the secondary site side included in the set. The node temporary ID after migration is an ID indicating to which node this group is to be stored after migration. The group performance, capacity, and node correspondence table is updated as needed during placement calculation. The required maximum capacity indicates a capacity required for all resources (normal volume and journal volume) within the group. The volume performance total maximum value of the group for each time is a performance maximum value required for all volumes at a certain time. Although only the IOPS and the throughput have been described in the drawing, another information may be described. Further, not only a maximum value but also a minimum latency to be satisfied may be described. In the drawing, a value for each minute is recorded, but a time interval is not limited thereto.

FIG. 12 illustrates a configuration example of the required node specification table 409.

The required node specification table 409 has information of a node temporary ID after migration, a server specification, a drive specification, and a drive capacity. Information on server and drive specifications required for each node temporary ID after migration is described by using type ID information described in the cost table.

Figure 14:
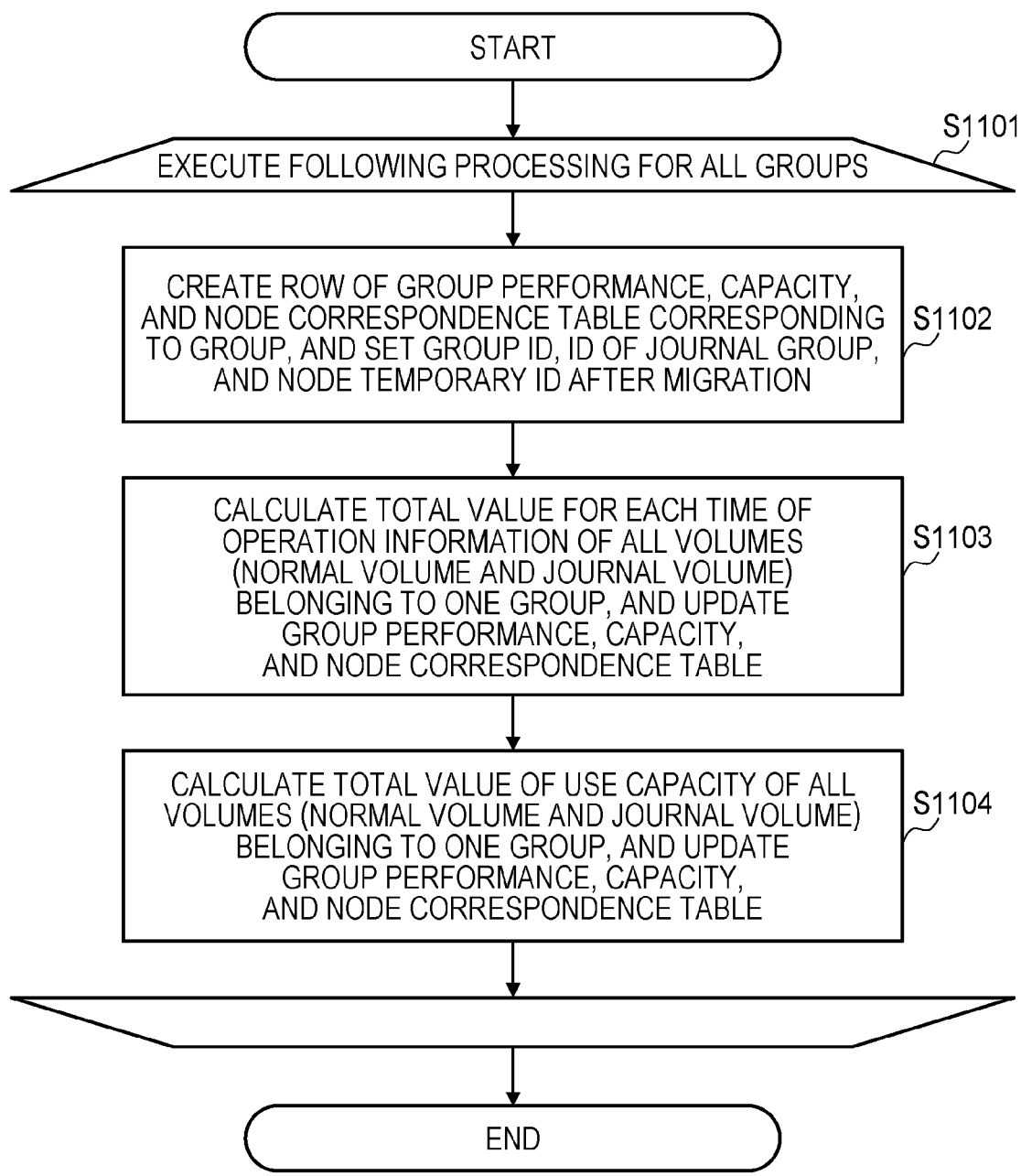
FIG. 14 illustrates an example of a flow of calculating a total performance maximum value and a required capacity of all groups in the first embodiment.
Figure 15:
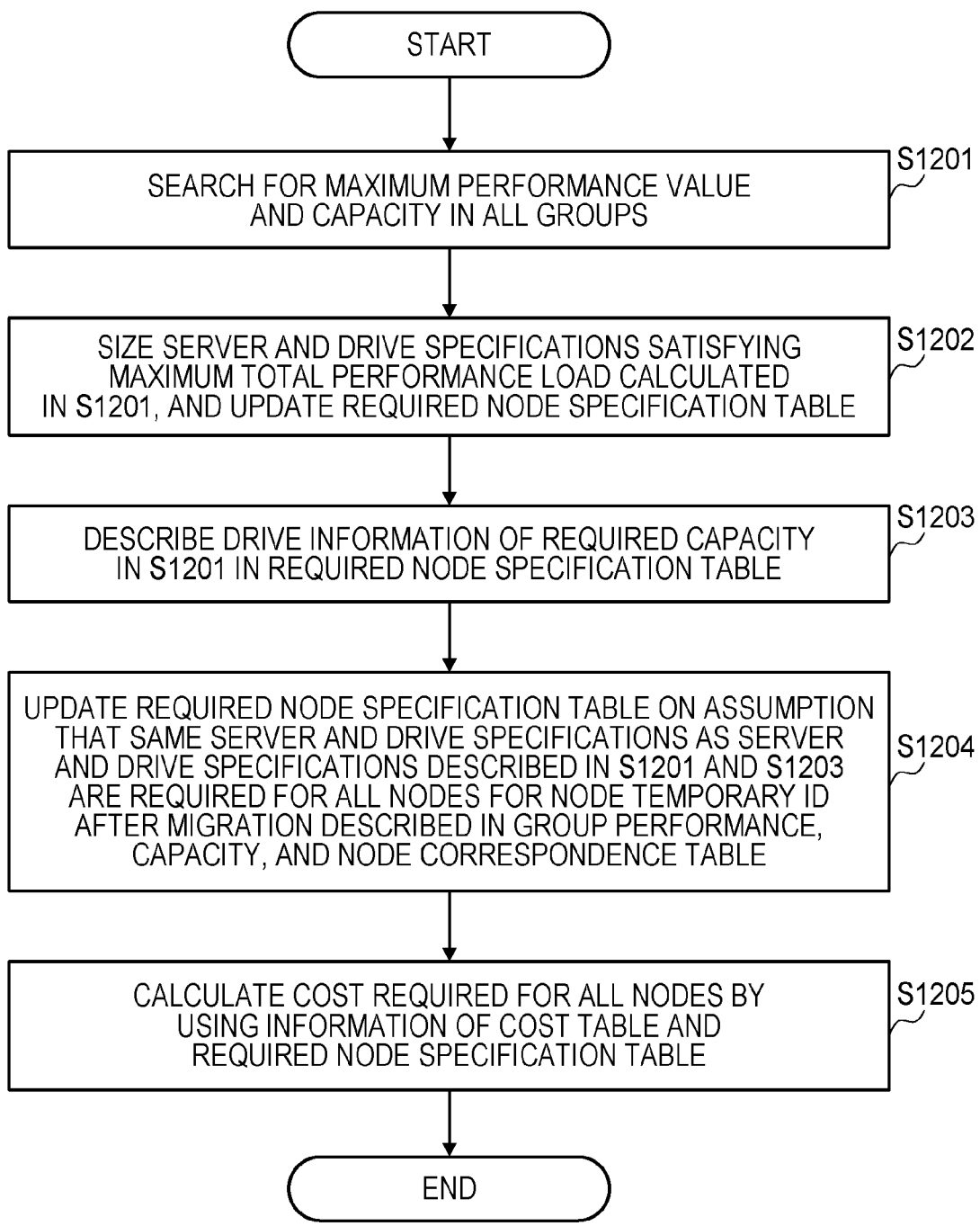
FIG. 15 illustrates an example of a flow of sizing hardware satisfying conditions of a maximum total performance load and a capacity and calculating cost in the first embodiment.
Figure 16:
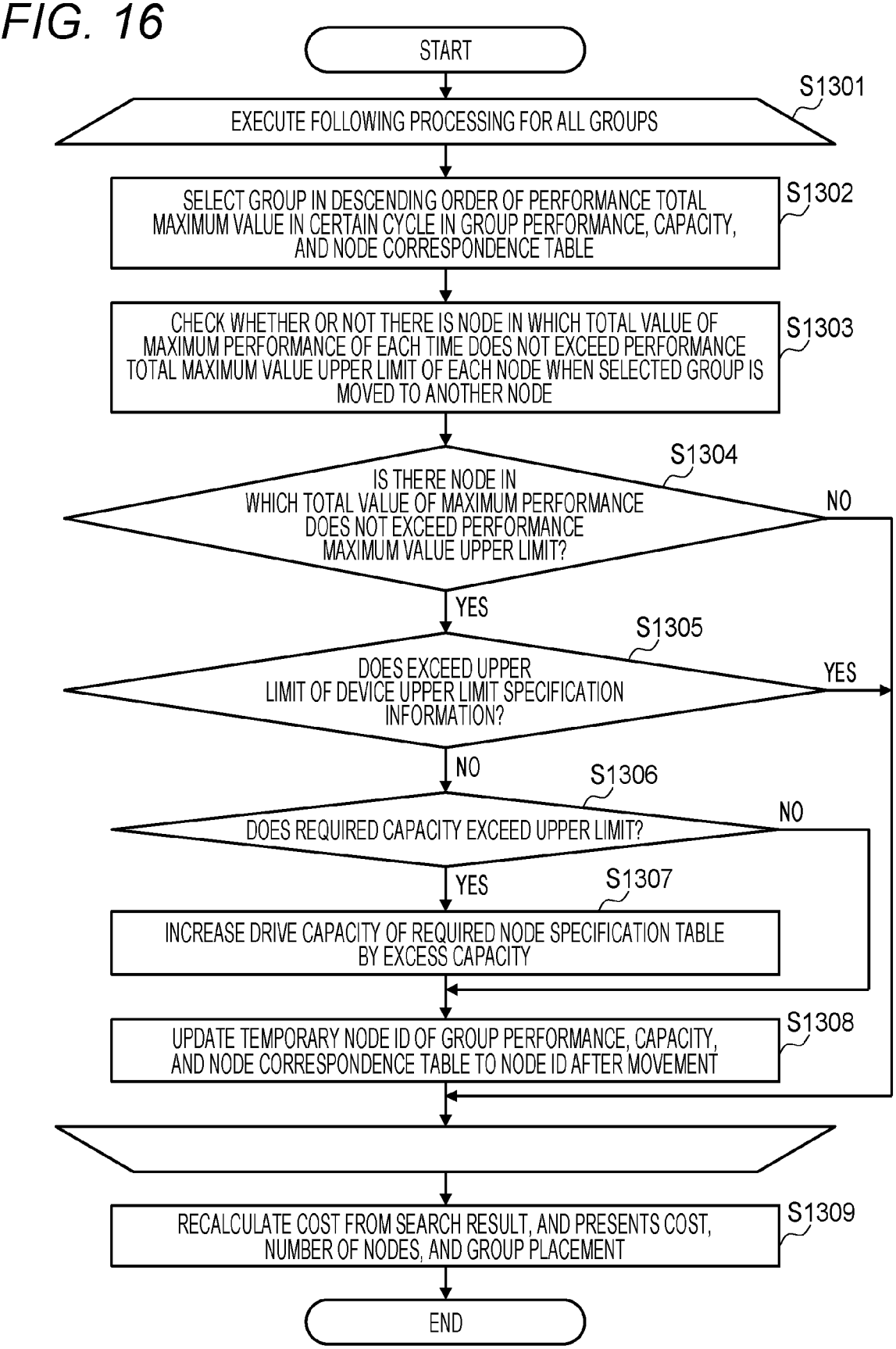
FIG. 16 illustrates an example of a flow of searching for and proposing server and drive specifications and the number of nodes in which cost becomes the lowest in the first embodiment.

Hereinafter, an example of processing performed in the present embodiment will be described. An outline of the processing is described in FIG. 13, and a detailed flow is illustrated in FIGS. 14 to 16.

Figure 13:
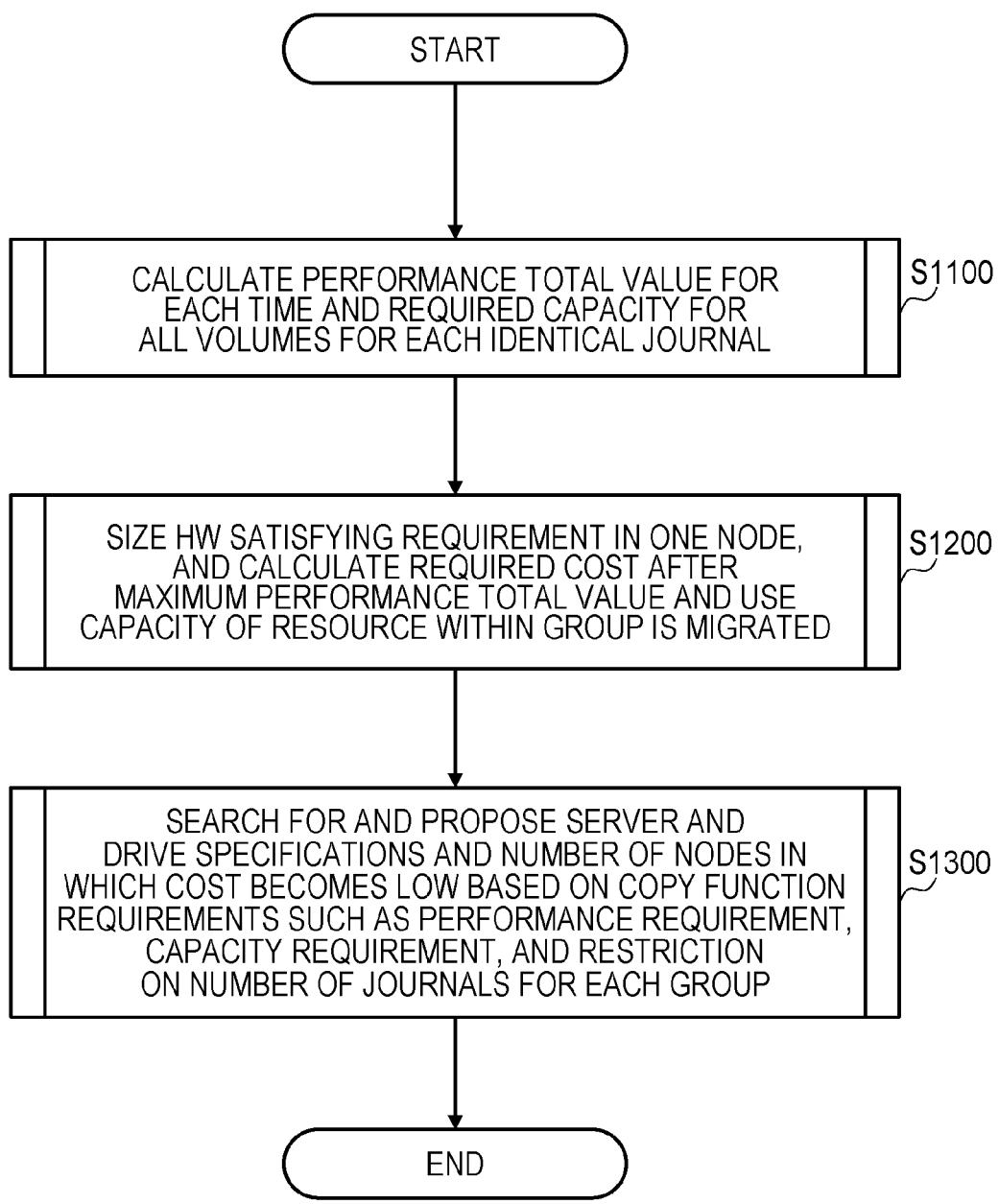
FIG. 13 illustrates an example of an overall flow in the first embodiment.

First, FIG. 13 illustrates an example of an overall flow in the first embodiment.

Note that, it is assumed that the information collection and update program 402 collects the information of the device-side configuration management table 204 from the storage systems 120-1 and 120-2 to be managed to update the management computer-side configuration management table 405 before the processing of FIG. 13 is started, and the information collection and update program 402 periodically collects the information of the device-side operation information management table 305 from the storage systems 120-1 and 120-2 to be managed to update the management computer-side operation information management table 406.

Further, it is assumed that the information of the cost table 407 is set by a storage administrator.

It is assumed that these kinds of processing have been completed, first, the flowchart of FIG. 13 is started by the user accessing the management computer 140.

When the user designates the primary storage system and the secondary storage system to be migrated, the placement calculation and proposal program 403 calculates, for each journal of the secondary storage system, a performance total value and the required capacity for each time for all the volumes within the CTG related to the journal (S1100). Details are illustrated in FIG. 14.

Subsequently, even after migration of a maximum total performance load and a use capacity to the secondary storage cluster, the placement calculation and proposal program 403 sizes hardware satisfying an original requirement (performance originally moved) in one node and calculates required cost (S1200). Details are illustrated in FIG. 15.

Finally, the placement calculation and proposal program 403 searches for and proposes server and drive specifications and the number of nodes in which combination cost becomes the lowest by calculating, for each group, whether aggregation is enable based on restrictions specific to copy function such as a performance upper limit, a capacity upper limit, and restrictions on the number of journal groups in another node (S1300). Details are illustrated in FIG. 16.

The specification of the node, the number of nodes, the journal, and the placement of the volume required in the secondary storage cluster after migration are determined by the above overall flow.

FIG. 14 illustrates an example of a flow of calculating a total performance maximum value and a required capacity of all groups in the first embodiment.

First, the placement calculation and proposal program 403 executes processing described in S1102 to S1104 on all the journals in a loop process of S1101.

The placement calculation and proposal program 403 creates rows of the group performance, capacity, and node correspondence table 408 corresponding to each journal. An ID of the group including the journal (ID of the CTG) and an ID of the journal group are set to the created rows. Further, as the node temporary ID after migration, an unused value is assigned and set (S1102).

Subsequently, the placement calculation and proposal program 403 calculates a total value for each time of the operation information of all the volumes (normal volume and journal volume) belonging to one group. The calculated result is set to the volume performance total maximum value of the group for each time in the group performance, capacity, and node correspondence table 408. At this time, a period (cycle) for calculating the operation information and the time interval may be previously set by the user, may be the same time interval as the management computer-side operation information management table 406, or may be any period (cycle) or time interval such as a fixed value (example: period=1 day, time interval=1 minute) determined by the system (S1103).

Subsequently, the placement calculation and proposal program 403 calculates a total value of use capacities of all the volumes (normal volume and journal volume) belonging to one group, and updates a value of the required maximum capacity of the group performance, capacity, and node correspondence table 408. Note that, the use capacity of each volume calculated at this time may be stored not only as a current value but also as a capacity use history as the operation information of the volume, and a predicted capacity may be added as the use capacity in the future (for example, after one year) from a capacity use history tendency. A future period at this time may be previously set by the user, or may be a fixed value determined by the system, or may be any value (S1104). The above processing is executed for all the journal groups, and the flowchart of FIG. 14 is ended.

FIG. 15 illustrates an example of a flow of sizing hardware satisfying conditions of the maximum total performance load and the capacity and calculating cost in the first embodiment.

First, the placement calculation and proposal program 403 searches for the maximum total performance load and the capacity in all the groups by using the information of the group performance, capacity, and node correspondence table 408 (S1201).

Subsequently, the placement calculation and proposal program 403 estimates (sizes) server specifications and drive specifications satisfying the maximum total performance load searched in S1201, and describes required server specifications and drive specifications in a first row of the required node specification table 409 (S1202). There are several implementation methods for the sizing method performed at this time. As an example, regarding throughput, for example, model expressions of throughput and IOPS are previously created for each part (memory, processor, drive, or the like) of hardware. The model expression of each part determines a model in consideration of an internal I/O processing content (one I/O command processing, execution processing of storage function such as copy, and user data transfer). Then, the model is calculated with a minimum value of the throughput of each part as throughput of one node. In this example, the model expressions are created from calculation results by stacking the model expressions from internal processing, but several patterns of I/Os may be actually issued with combination specifications of several parts, and the model may be determined from an experimental result. Hardware specifications satisfying values of required requirements (IOPS, throughput, and the like) are estimated (sized) by using such a model. In the case of the public cloud, the network band between the primary site and the secondary site may be determined in advance, but in this case, a network bandwidth may be calculated in a fixed manner. The above estimation (sizing) method is an example, and other estimation methods may be used. Note that, in the storage cluster of the present embodiment, the active and standby storage control programs are connected in a row. When a node failure occurs, a standby storage control program of another node corresponding to the active storage control program of the node is promoted to active, and two active storage control programs simultaneously operate in one node. Accordingly, performance required in one node is considered to be total performance in consideration of a case where an active storage control program of another node migrates by failover. That is, it can be said that the above-described sizing method is sizing required for each active storage control program when the active storage control program is operating in a state where a failure does not occur in each node.

Note that, regarding the description of S1202 in the required node specification table 409, a type of the server and a type of the drive required for satisfying the sizing result are specified by using the information of the server cost information 407-1 and the drive cost information 407-2 in the cost table 407, and the type IDs of the result are described in the required node specification table 409.

Subsequently, the placement calculation and proposal program 403 describes a value of the drive having the maximum capacity searched in S1201 in the drive capacity in the first row of the required node specification table 409 (S1203).

Subsequently, the placement calculation and proposal program 403 describes the information of the node temporary ID after migration described in the group performance, capacity, and node correspondence table 408 in the required node specification table 409, and sets all the nodes to the same server specification, drive specification, and drive capacity as the first row (S1204).

Subsequently, the placement calculation and proposal program 403 calculates the cost required for all the nodes by using the information of the cost table 407 and the required node specification table 409 (S1205). As described above, the flowchart of FIG. 15 is ended.

FIG. 16 illustrates an example of a flow of searching for and proposing the server and drive specifications and the number of nodes in which the cost becomes the lowest in the first embodiment 1. The flow is different between a case where optimization is considered based on performance and a case where optimization s considered based on a capacity. FIG. 16 illustrates a method for calculating placement such that a performance upper limit determined in the flow up to FIG. 15 is kept, and calculating placement of a performance criteria that allows each node to exceed a capacity of the node determined in the flow up to FIG. 15 in some cases. Basically, it is often important to reduce the number of nodes in terms of cost. Since there is a high possibility that the number of nodes cannot be reduced when both the performance and capacity upper limits need to be satisfied, such a flow is considered. Further, in general, when the performance of the server is higher than the performance of the drive, since the cost tends to be higher, in the present embodiment, the optimization based on the performance is described as an example of the embodiment.

First, the placement calculation and proposal program 403 executes processing from S1302 to S1308 for all the groups (resources (journal and volume) of the secondary storage system within the group).

First, in S1302, the placement calculation and proposal program 403 selects a group in descending order of the performance total maximum values in a certain cycle in the group performance, capacity, and node correspondence table 408 (S1302).

Subsequently, it is assumed that the currently selected group is moved to another node, the placement calculation and proposal program 403 checks whether or not there is a node in which the total value of the maximum performance at each time does not exceed the performance total maximum value upper limit of each node (S1303). Specifically, the check is performed in the following example. For example, in the group performance, capacity, and node correspondence table 408 of FIG. 11, only an example of IOPS will be described first in order to simplify the description. In a period in which a group in which a Group ID is G3 is from 10:00:00 to 10:01:00, a maximum value of IOPS is 100 and is the smallest in all the groups. It is assumed that the group of G3 is currently placed in a node NN3. When the node is moved to another node, for example, a node NN2 (that is, when the node is set to stay in the same node as a group of G2), the total value of IOPS at 10:00:00 becomes 400. Further, a total value of IOPS of 10:01:00 is 200+100=300. When a maximum value of each time of a single node is looked, G1 scheduled to be placed in NN1 takes a maximum value in the current FIG. 11, and the total value of 300 when the node is moved earlier than 550 does not exceed 550. Accordingly, it can be determined that performance can be covered by a node of a server specification S1 and a drive specification D1 described in the required node specification table 409. On the other hand, when the group of G3 is taken to the NN1 in which a group of G1 is scheduled to be placed, the total value exceeds the performance total maximum value upper limit. This means that the group of G3 cannot be taken to G1. In this manner, it is checked whether or not there is a node in which the total value of the maximum performance of each time does not exceed the performance total maximum value upper limit of each node. In the above example, only IOPS is described. However, the present invention is not limited to the IOPS, and the same applies to the throughput illustrated in FIG. 11, and it is checked whether or not there is a node in which the total value thereof does not exceed the upper limit as a whole. Further, in addition to the performance of the storage system, it may be checked whether or not a network bandwidth does not a network bandwidth upper limit between the primary site and the secondary site.

Subsequently, in S1304, the placement calculation and proposal program 403 determines whether or not there is a node in which the total value thereof does not exceed the performance maximum value upper limit by the check in S1303. When the result is negative in S1304 (=NO), the processing returns to S1301, a group having a next smallest performance total maximum value is selected, and the processing is repeated from S1302. When the result is positive in S1304 (=YES), the processing proceeds to S1305.

In step S1305, the placement calculation and proposal program 403 checks whether or not the device upper limit specification information exceeds an upper limit on the assumption that the group is moved to another node. This means that it is checked whether or not the storage system or the storage cluster exceeds a function upper limit when the resources are placed one node, which is described in the device upper limit specification information within the management computer-side configuration management table 405 (the same as the device upper limit specification information 204-6 in the device-side configuration management table). More specifically, when it is considered that G3 migrates to the NN2 in S1303, there are two journals in one node (more specifically, a management range of one storage control program). Since two journals are four or less of the device upper limit specification information (the same as the device upper limit specification information 204-6 in the device-side configuration management table), in this case, S1305 has a negative result (=NO). When a positive determination is made in S1305 (=YES), the processing returns to S1301. When a negative determination is made in S1305 (=NO), the processing proceeds to S1306.

Subsequently, in S1306, the placement calculation and proposal program 403 checks whether or not the required capacity exceeds the upper limit on the assumption that the group is moved to another node. As a more specific example, when the group of G3 in FIG. 11 is taken to the NN2, the required capacity is 100+50=150, and does not exceed the upper limit of 200. Accordingly, the result is negative (=NO). When a positive determination is made in S1306 (=YES), the processing proceeds to S1307. When a negative determination is made in S1306 (=NO), the processing proceeds to S1308.

This case is up to S1306, and S1307 is a pattern in which the placement falls within the performance upper limit but exceeds the capacity upper limit. In this case, the placement calculation and proposal program 403 increases the drive capacity with which the group of the required node specification table 409 is moved by an excess capacity.

In S1308, the placement calculation and proposal program 403 deletes the row of the node temporary ID after migration in which the group to be migrated is originally placed in the required node specification table 409. Further, the node temporary ID after migration of the group to be migrated in the group performance, capacity, and node correspondence table 408 is updated. As a more specific example, since it is considered that the group of G3 of which the node temporary ID after migration is NN3 migrates to the node of which the node temporary ID after migration is NN2, a row in which the node temporary ID after migration is NN3 in the required node specification table 409 is deleted, and the node temporary ID after migration of G3 in the group performance, capacity, and node correspondence table 408 is updated to NN2.

When the above processing is completed, the processing returns to S1301, and the same processing is executed for all the groups.

When the processing is executed on all the groups, the required number of nodes, node specifications (server specification and drive specification), and placement of the groups based on the performance are determined.

In S1309, the placement calculation and proposal program 403 recalculates cost from the information of the required node specification table 409, the group performance, capacity, and node correspondence table 408, and the cost table, and presents the calculated cost, the number of nodes, and the group placement to the user.

As described above, it is possible to search for and propose the server and drive specifications and the number of nodes in which the cost becomes low based on the copy function requirements such performance as requirements, capacity requirements, and restrictions on the number of journals for each group. As described above, this example is a flow determined based on the performance. When the optimization is considered based on the capacity as another form, a flow of initially checking the capacity in an initial flow of FIG. 16 and checking whether or not the performance falls within the upper limit within the range satisfying the capacity upper limit. Note that, both the flow based on the performance and the flow based on the capacity be performed to search for a configuration in which the number of nodes becomes the smallest as a result. Further, although the examples of the above-described placement searches based on the performance and the capacity in FIG. 16 illustrate an algorithm based on a simple dynamic planning method, a more advanced combination optimum calculation may be performed to calculate a more strictly optimal placement and combination of the number of nodes.

Example 2

A second embodiment will be described. At this time, differences from the first embodiment will be mainly described, and the description of common points with the first embodiment will be omitted or simplified.

In the first embodiment, movement and placement related to one journal group and a set of secondary volumes related thereto are basically calculated in units of consistency groups (CTG) in which a unit for calculating node placement includes journals.

However, in an operation of the storage, there may be not only the volumes of the consistency group including the journal of the remote copy, but also volumes related to these volumes or volume groups which are not related within the storage device, but are desired to be operated together or placed in the same storage in view of an operation application of a higher application. In the first embodiment alone, there is a possibility that these volume groups are distributed and placed in another node. Further, there may be volume groups that are originally stored in one storage system, but are internally physically distributed by separating parity groups or the like from the viewpoint of availability, and are desired to be physically distributed and operated even after migration.

Therefore, in the second embodiment, a pattern in which node placement is considered in an extended group concept including not only journals and volumes related thereto but also volumes and snapshots related to the secondary volume or volumes that are not related within a direct storage device but are used by a host application and are desired to continue an operation within the same storage is illustrated. Further, it is considered that the placement of the group can be calculated in consideration of not only the performance, the capacity, and the storage function upper limit at the time of simply placing the nodes but also a condition in which the nodes are to be placed in the same node (the same storage control program) in terms of the operation.

Since a basic configuration of the computer system is the same between the first embodiment and the second embodiment, the description thereof will be omitted.

Since information managed by the management computer increases as a difference in configuration, a difference between the information and a flow using the information will be described.

Figure 17:
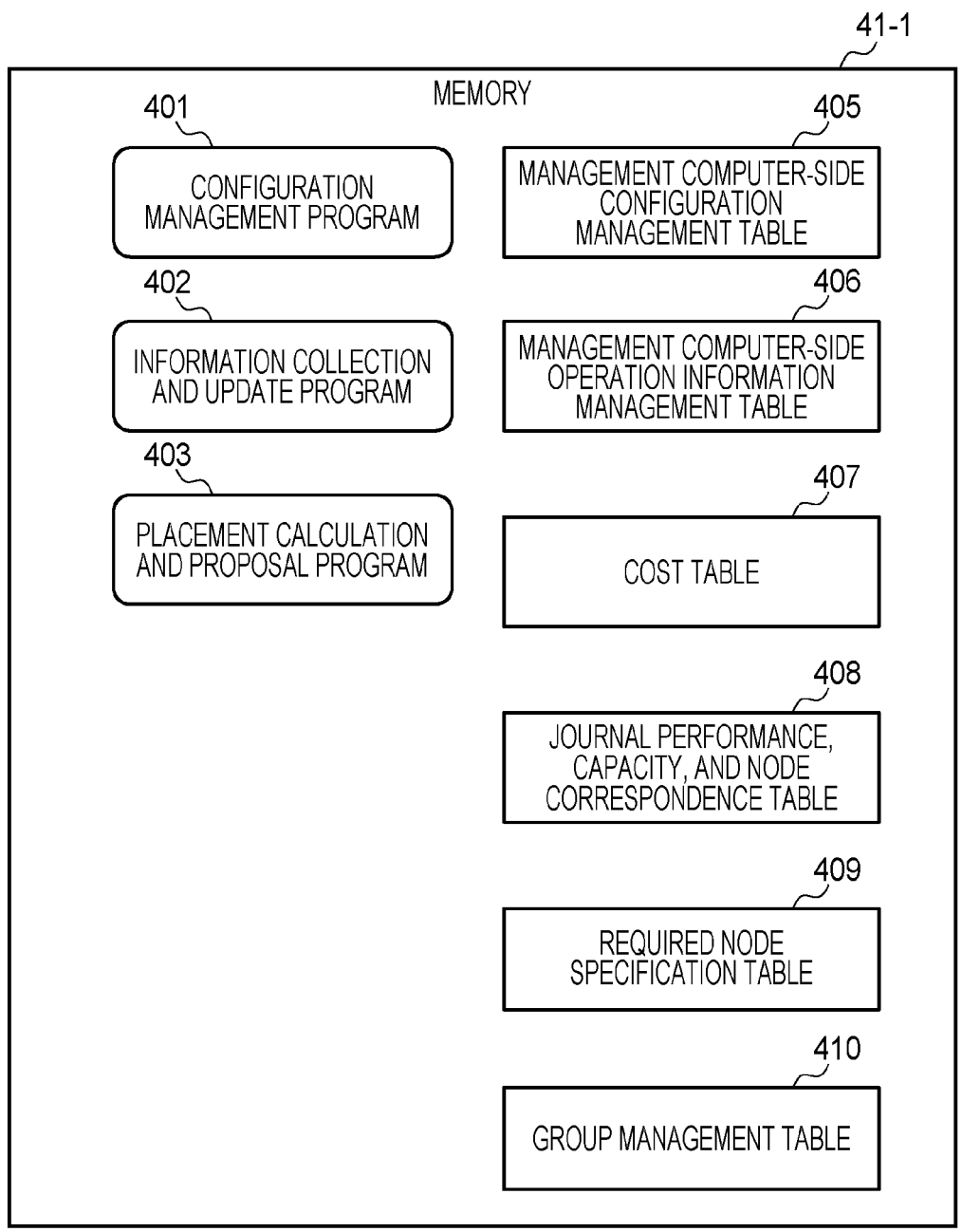
FIG. 17 illustrates an example of a program and data stored in a memory 41-1 in a management computer 140 in a second embodiment.

FIG. 17 illustrates an example of the program and data stored in the memory 41-1 in the management computer 140 in the second embodiment.

A difference from the first embodiment is that a group management table 410 is added.

The group management table 410 is a management table that stores group information obtained by extending the group (CTG) of journals of the first embodiment. This group management table is updated by the configuration management program 401. A value of this information may be set by the user by using a previous update instruction as an input. Further, the components of the group may be automatically set by association of the copy pair within the storage system or association information of other internal functions.

FIG. 18 illustrates a configuration example of the group management table 410 in the second embodiment.

The group management table 410 has information of a Group ID, group component, and group-specific requirement. The Group ID is an identifier of the group. The group component indicates an identifier of a resource that is a component included in the group. As an example, a journal and a volume (a snapshot as a type of volume) are described, but the present invention is not limited thereto, and other information may be set. The group-specific requirement indicates a special requirement specific to the group. Affinity requirements and specific performance are described as examples. The Affinity requirement is a requirement indicating information when there is a condition in which a certain group and another group may or may not stay together. Specifically describing in the example of FIG. 18, the Affinity requirement means that a group of GR1 and a group of GR2 may not be placed in the same node even though the requirements of performance and capacity are satisfied when placement calculation is performed. Regarding the specific performance, in the placement calculation so far, whether or not the total performance of all the volumes for each group required by the resource at the secondary site between the original on-premises storage systems is satisfied is determined as a criterion. However, when the on-premises storage system migrates to the cloud, the performance requirements do not necessarily coincide. Therefore, when the requirements are changed, the performance requirement will be described in the specific performance. Requirements such as IOPS and throughput are described. Although omitted in the drawing, performance requirements for each time may be described.

Next, a processing flow of the second embodiment will be described. Basically, processing performed in the group (corresponding to CTG) in the first embodiment is merely changed to processing in units of extended groups in FIG. 18, and a large flow is not changed. However, since there is a change in the placement calculation flow, the change will be described.

Figure 19:
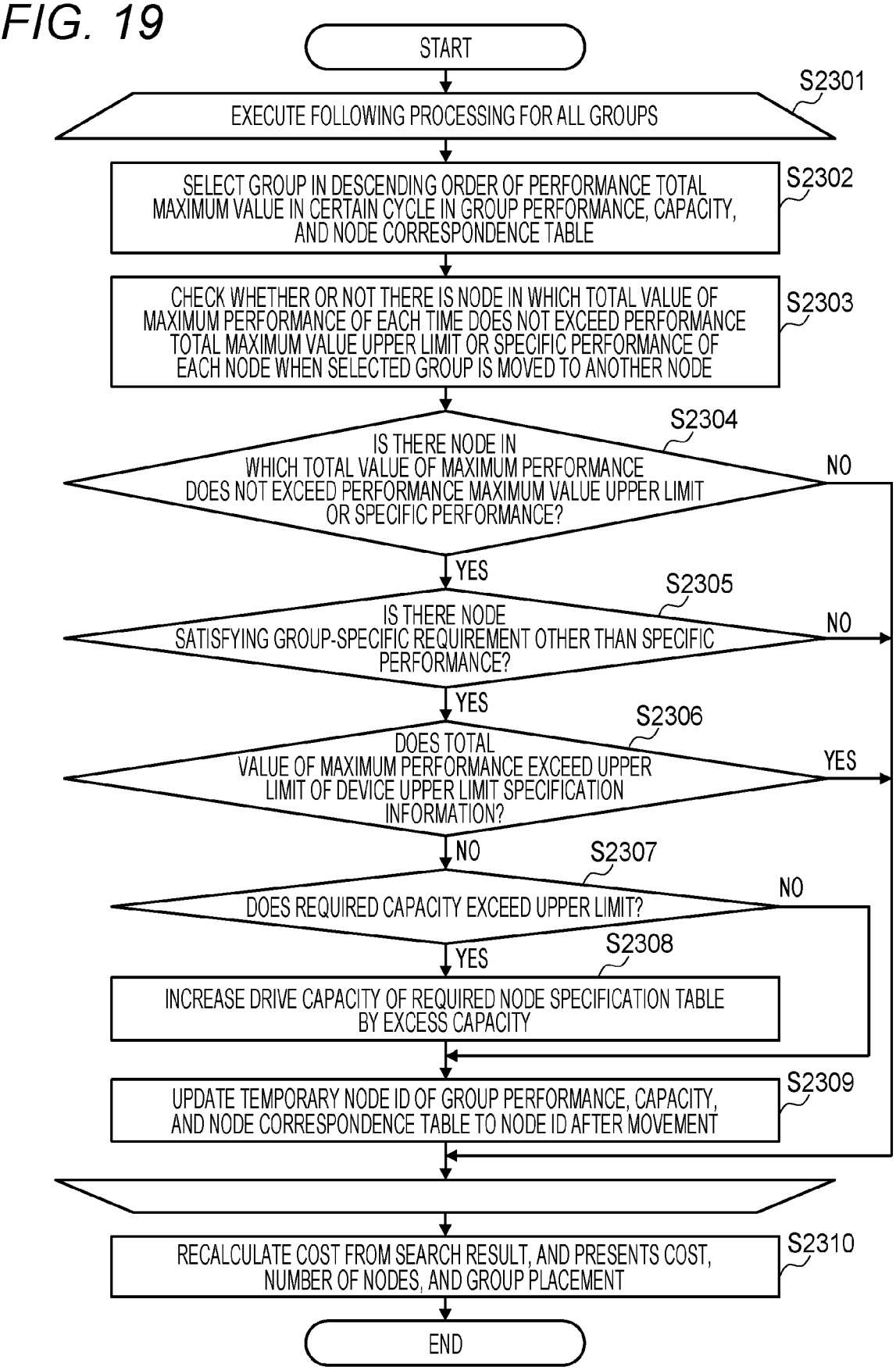
FIG. 19 illustrates an example of a flow of searching for and proposing server and drive specifications and the number of nodes in which cost becomes the lowest in the second embodiment.

FIG. 19 illustrates an example of a flow of searching for and proposing the server and drive specifications and the number of nodes in which cost becomes the lowest in the second embodiment.

Similarly to FIG. 16, FIG. 19 illustrates an example of an optimization flow based on the performance.

First, the placement calculation and proposal program 403 executes processing from S2302 to S2309 for all the groups (group described in FIG. 18 in addition to the journal or CTG).

First, in S2302, the placement calculation and proposal program 403 selects groups in descending order of the performance total maximum values in a certain cycle in the group performance, capacity, and node correspondence table 408 (S2302).

Subsequently, it is assumed that the currently selected group is moved to another node, the placement calculation and proposal program 403 checks whether or not there is a node in which the total value of the maximum performance at each time does not exceed the performance total maximum value upper limit of each node or the specific performance described in the group management table 410 (S2303). Specifically, only the difference from the first embodiment is illustrated. When the specific performance is not described in the group management table 410, the same performance total maximum value upper limit as in the first embodiment is checked. When the specific performance is described in the group management table 410, a value of the specific performance is checked instead of the performance total maximum value upper limit. The other configurations are the same as the configurations of the embodiment.

Subsequently, in S2304, the placement calculation and proposal program 403 determines whether or not there is a node in which the total value thereof does not exceed the performance maximum value upper limit or the specific performance by the check in S2303. When the result is negative in S2304 (=NO), the processing returns to S2301, a group having a next smallest performance total maximum value is selected, and the processing is repeated from S2302. When the result is positive in S2304 (=YES), the processing proceeds to S2305.

In S2305, the placement calculation and proposal program 403 checks whether or not there is a node satisfying the group-specific requirement other than the specific performance. Specifically, in the example of FIG. 18, the Affinity requirement is considered. When a case where GR1 is moved to another node is considered, even though the maximum value upper limit of the total performance or the upper limit of the specific performance is satisfied when GR1 is moved to a node where there is GR2, since the Affinity requirement is not satisfied, it is determined that there is no node satisfying the group-specific requirement other than the specific performance. When a negative determination is made in S2305 (=NO), the processing returns to S2301. When a positive determination is made in S2305 (=YES), the processing proceeds to S2306.

In step S2306, the placement calculation and proposal program 403 checks whether or not the device upper limit specification information exceeds an upper limit on the assumption that the group is moved to another node. This means that it is checked whether or not the storage system or the storage cluster exceeds a function upper limit when the resources are placed one node, which is described in the device upper limit specification information within the management computer-side configuration management table 405 (the same as the device upper limit specification information 204-6 in the device-side configuration management table). When a positive determination is made in S2306 (=YES), the processing returns to S2301. When a negative determination is made in S2306 (=NO), the processing proceeds to S2307.

Subsequently, in S2307, the placement calculation and proposal program 403 checks whether or not the required capacity exceeds the upper limit on the assumption that the group is moved to another node. When a positive determination is made in S2307 (=YES), the processing proceeds to S2308. When a negative determination is made in S2307 (=NO), the processing proceeds to S2309.

This case is up to S2307, and S2308 is a pattern in which the placement falls within the performance upper limit but exceeds the capacity upper limit. In this case, the placement calculation and proposal program 403 increases the drive capacity with which the group of the required node specification table 409 is moved by an excess capacity.

In S2309, the placement calculation and proposal program 403 deletes the row of the node temporary ID after migration in which the group to be migrated is originally placed in the required node specification table 409. Further, the node temporary ID after migration of the group to be migrated in the group performance, capacity, and node correspondence table 408 is updated.

When the above processing is completed, the processing returns to S2301, and the same processing is executed for all the groups.

When the processing is executed on all the groups, the required number of nodes, node specifications (server specification and drive specification), and placement of the groups based on the performance are determined.

In S2310, the placement calculation and proposal program 403 recalculates cost from the information of the required node specification table 409, the group performance, capacity, and node correspondence table 408, and the cost table, and presents the calculated cost, the number of nodes, and the group placement to the user.

As described above, it is possible to search for and propose the server and drive specifications and the number of nodes in which the cost becomes low based on the copy function requirements such as performance requirements, capacity requirements, and restrictions on the number of journals for each group of resources equal to or higher than the CTG including the journal and the volume to be paired therewith, and requirements specific to the group.

Although several embodiments have been described above, these embodiments are merely examples for describing the present invention, and are not intended to limit the scope of the present invention to only these embodiments. The present invention can be implemented in other various forms.

For example, in at least one of the first and second embodiments, a migration destination of the secondary site is described as the public cloud, but may be a private cloud.

Further, for example, in the first and second embodiments, a relationship between the primary site and the secondary site between the on-premises data center 1 and the on-premises data center 2 is described as a relationship of 1:1, but a relationship of 1:N in which a plurality of on-premises data centers 2 at the secondary site are present with respect to the on-premises data center 1 at the primary site may be used. Further, the public cloud (or private cloud) of the migration destination may also use a plurality of sites instead of one site, and may be supported by storage clusters at a plurality of sites.

Further, for example, in the first and second embodiments, the storage system at the secondary site has a one-node configuration, but may have a configuration of a storage cluster (a plurality of nodes).

Further, in the first embodiment, the processing of reducing the number of nodes on the assumption that the number of nodes has a larger influence on the cost than the specification of the nodes has been described. However, it is also possible to compare cost of the configuration in which the specification is reduced without changing the number of nodes with cost of the configuration in which the number of nodes is reduced, and select the configuration with the lower cost.

As described above, the disclosed computer system 10 includes the storage system 120 in which the primary site that provides one or a plurality of primary volumes to the host 110 is constructed, the storage cluster 130 connected to the storage system via the network and having the plurality of nodes, and the management computer 140.

When the secondary site including the secondary volume to which the remote copy of the primary volume at the primary site is set is constructed in the storage cluster 130, the management computer 140 manages, as the group, the plurality of volumes including the secondary volume, and performs control such that the plurality of volumes including the secondary volume are placed in the plurality of nodes of the storage cluster based on the group.

Specifically, control is performed such that the plurality of volumes that are within the same group and are to be placed in the secondary site are placed in the same node within the storage cluster.

According to this configuration and operation, it is possible to propose a configuration that achieves both performance and cost when the secondary site of the remote copy is constructed on the cloud.

Further, the primary journal volume for copying and storing update data of the primary volume is formed in the primary site, the secondary journal volume for storing update data to be written to the secondary volume is formed in the secondary site, the update data being copied from the primary journal volume via the network, and the remote copy is performed by copying the update data of the primary volume to the secondary volume via the primary journal volume and the secondary journal volume. The management computer 140 manages, as the same group, a combination of the primary volume, the primary journal, the secondary volume, and the secondary journal volume, which are related to the same remote copy.

Thus, it is possible to propose an inexpensive configuration while placing the secondary volume and the secondary journal volume in the same node.

Further, the management computer 140 calculates load amounts of the secondary journal volume and the secondary volume of the same group based on the operation information of the primary volume, and determines a node in which the secondary journal volume and the secondary volume are placed based on the calculated load amounts of the secondary journal volume and the secondary volume and the information of the node of the storage cluster.

Further, in the computer system, the management computer 140 calculates a use capacity that can be used by the secondary journal volume and the secondary volume of the same group based on the operation information of the primary volume, and determines a node in which the secondary journal volume and the secondary volume are placed based on the calculated load amounts and use capacities of the secondary journal volume and the secondary volume and the information of the node of the storage cluster.

Thus, the performance actually required for the node can be reliably ensured.

Further, the information of the node of the storage cluster includes information of the cost, and the management computer 140 determines a node in which the secondary journal volume and the secondary volume are placed based on the calculated load amounts of the secondary journal volume and the secondary volume and the information of the node of the storage cluster including the cost.

Thus, it is possible to search for a configuration with low cost.

Further, the management computer 140 determines a node in which the secondary journal volume and the secondary volume are placed such that the number of nodes in which the secondary journal volumes and the secondary volumes of the plurality of groups are placed is reduced.

Thus, the number of nodes can be reduced while securing performance, and the cost of the storage cluster can be reduced.

Further, an item upper limit which is an upper limit of an item of a resource is defined in the node, the item of the resource includes at least one of the number of journal volumes, the number of secondary volumes, the number of remote copies, and the number of pairs, and the management computer 140 determines a node in which the secondary journal volume and the secondary volume are placed based on the calculated load amounts of the secondary journal volume and the secondary volume, the information of the node of the storage cluster including the cost, and the upper limit.

Thus, the cost of the storage cluster can be reduced within a range in which the resource satisfies a predetermined condition.

Further, in the disclosed system, the secondary volume and the secondary journal volume are redundant by an active storage control program and a standby storage control program placed in different nodes, and when a failure occurs in the active storage, a standby storage control program of a different node can take over and operate the secondary volume and the secondary journal volume, and a plurality of pieces of active or standby storage control software can be operated in the same node.

The management computer 140 determines a node in which the secondary journal volume and the secondary volume are placed based on a total value of load amounts of the active storage control program and the storage control program of which the state is changed from standby to active.

With this configuration and operation, it is possible to construct the secondary site capable of securing performance even though failover occurs.

What is claimed is:

1. A computer system comprising:
   a storage system that constructs a primary site that provides at least one primary volume to a host;
   a storage cluster that is connected to the storage system via a network, and has a plurality of nodes;
   a secondary site constructed in the storage cluster and having a secondary volume to which a remote copy of the at least one primary volume at the primary site is set; and
   a management computer that
      manages at least one group, each of the at least one group includes a plurality of volumes including a secondary volume,
      calculates, for each of the at least one group, a total amount of input/output operations per second (IOPS) and throughput for all volumes in the at least one group at each predetermined time,
      calculates, for each of the at least one group, a total required maximum capacity for all of the volumes in the at least one group,
      estimates hardware specifications satisfying an original requirement in each of the plurality of nodes and calculates a required cost,
      calculates, for each of the at least one group, whether aggregation is possible based on the total amount of IOPS and throughput, the total required maximum capacity and hardware specifications,
      for each of the at least one group where aggregation is possible, searches the plurality of nodes and proposes at least one node of the plurality of nodes where each of the at least one group can be placed, and
      places each of the at least one group where aggregation is possible in at least one node of the plurality of nodes.

2. The computer system according to claim 1, further comprises:
   a primary journal volume, formed in the primary site, for copying and storing primary volume update data for each of the at least one primary volume; and
   a secondary journal volume, formed in the secondary site, for storing update data to be written to the secondary volume, the update data being copied from the primary journal volume via the network,
   wherein the remote copy is performed by copying the primary volume update data to the secondary volume via the primary journal volume and the secondary journal volume, and
   wherein the management computer manages, as a same group, a combination of the at least one primary volume, the primary journal volume, the secondary volume, and the secondary journal volume which are related to a same remote copy.

3. The computer system according to claim 2, wherein the management computer, in calculating the total amount of IOPS and throughput, calculates load amounts of the secondary journal volume and the secondary volume of the same group based on operation information of the at least one primary volume, and determines the at least one node in which the secondary journal volume and the secondary volume are placed based on the calculated load amounts of the secondary journal volume and the secondary volume, and node information of a at least one node.

4. The computer system according to claim 3, wherein the management computer calculates a use capacity with which the secondary journal volume and the secondary volume of the same group are used based on the operation information of the at least one primary volume, calculates the total required maximum capacity using the use capacity, and determines the at least one node based on the calculated load amounts of the secondary journal volume and the secondary volume, the use capacity, and the node information.

5. The computer system according to claim 4, wherein information of cost is included in the node information, and
   the management computer determines the at least one node based on the calculated load amounts of the secondary journal volume and the secondary volume, and the node information of the node including the cost.

6. The computer system according to claim 5, wherein the management computer determines a node in which the secondary journal volume and the secondary volume are placed such that a number of nodes in which a plurality of secondary journal volumes and a plurality of secondary volumes of a plurality of groups are placed is reduced.

7. The computer system according to claim 6, wherein
   an item upper limit, which is an upper limit of an item of a resource, is defined in the node,
   at least one of a number of the plurality of secondary journal volumes, a number of the plurality of secondary volumes, a number of remote copies, and a number of pairs is included in the item of the resource, and
   the management computer determines the at least one node based on the calculated load amounts of the secondary journal volume and the secondary volume, the node information including the cost, and the item upper limit.

8. The computer system according to claim 3, wherein the secondary volume and the secondary journal volume are redundant by an active storage control program and a standby storage control program placed in different nodes and when a failure occurs in the active storage control, the standby storage control program in a different node takes over and operates the secondary volume and the secondary journal volume, a plurality of pieces of active or standby storage control software are operable in a same node, and the management computer determines the at least one node based on a total value of load amounts of the active storage control program and a storage control program of which a state is changed from standby to active.

9. The computer system according to claim 1, wherein a plurality of volumes, which are within a same group and are to be placed in the secondary site, are placed in a same node within the storage cluster.

10. A management method for a computer system that includes a storage system that constructs a primary site that provides at least one primary volume to a host, a storage cluster connected to the storage system, via a network, and having a plurality of nodes, and a management computer, the method comprising:

constructing, in the storage cluster, a secondary site having a secondary volume to which a remote copy of the at least one primary volume at the primary site is set;

managing, by the management computer, at least one group, each of the at least one group includes a plurality of volumes including a secondary volume;

calculating, for each of the at least one group, a total amount of input/output operations per second (IOPS) and throughput for all volumes in the at least one group at each predetermined time;

calculating, for each of the at least one group, a total required maximum capacity for all of the volumes in the at least one group;

estimating hardware specifications satisfying an original requirement in each of the plurality of nodes and calculates a required cost;

calculating, for each of the at least one group, whether aggregation is possible based on the total amount of IOPS and throughput, the total required maximum capacity and hardware specifications;

for each of the at least one group where aggregation is possible, searching the plurality of nodes and proposing at least one node of the plurality of nodes where each of the at least one group can be placed; and placing each of the at least one group where aggregation is possible in at least one node of the plurality of nodes.

* * * * *